May 18, 1943.   F. S. STERNAD ET AL   2,319,643
PNEUMATIC TIRE MACHINE
Filed Aug. 19, 1937   24 Sheets-Sheet 21
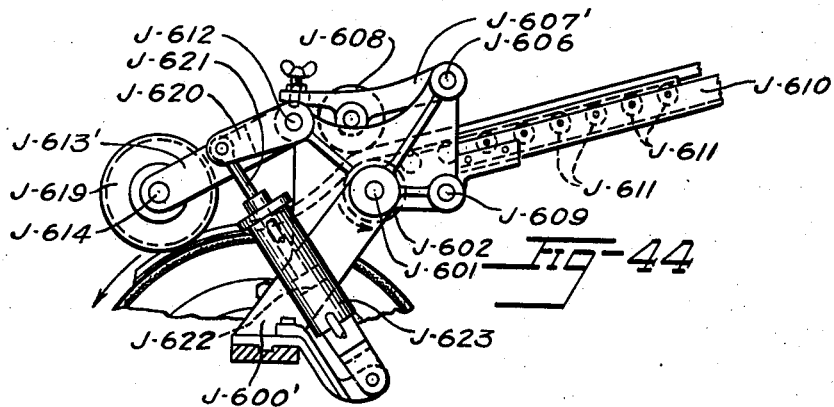
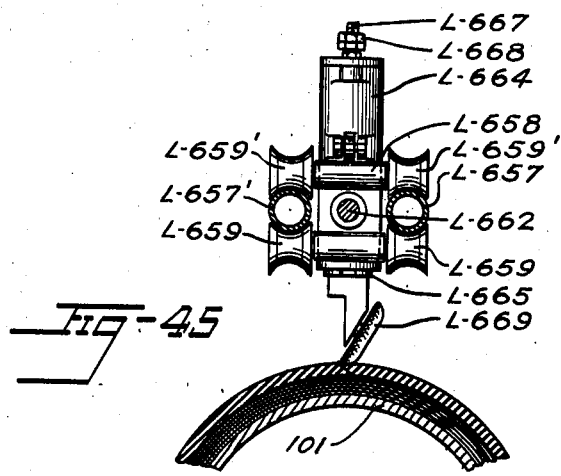
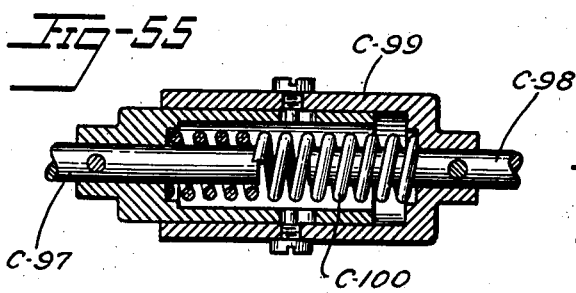

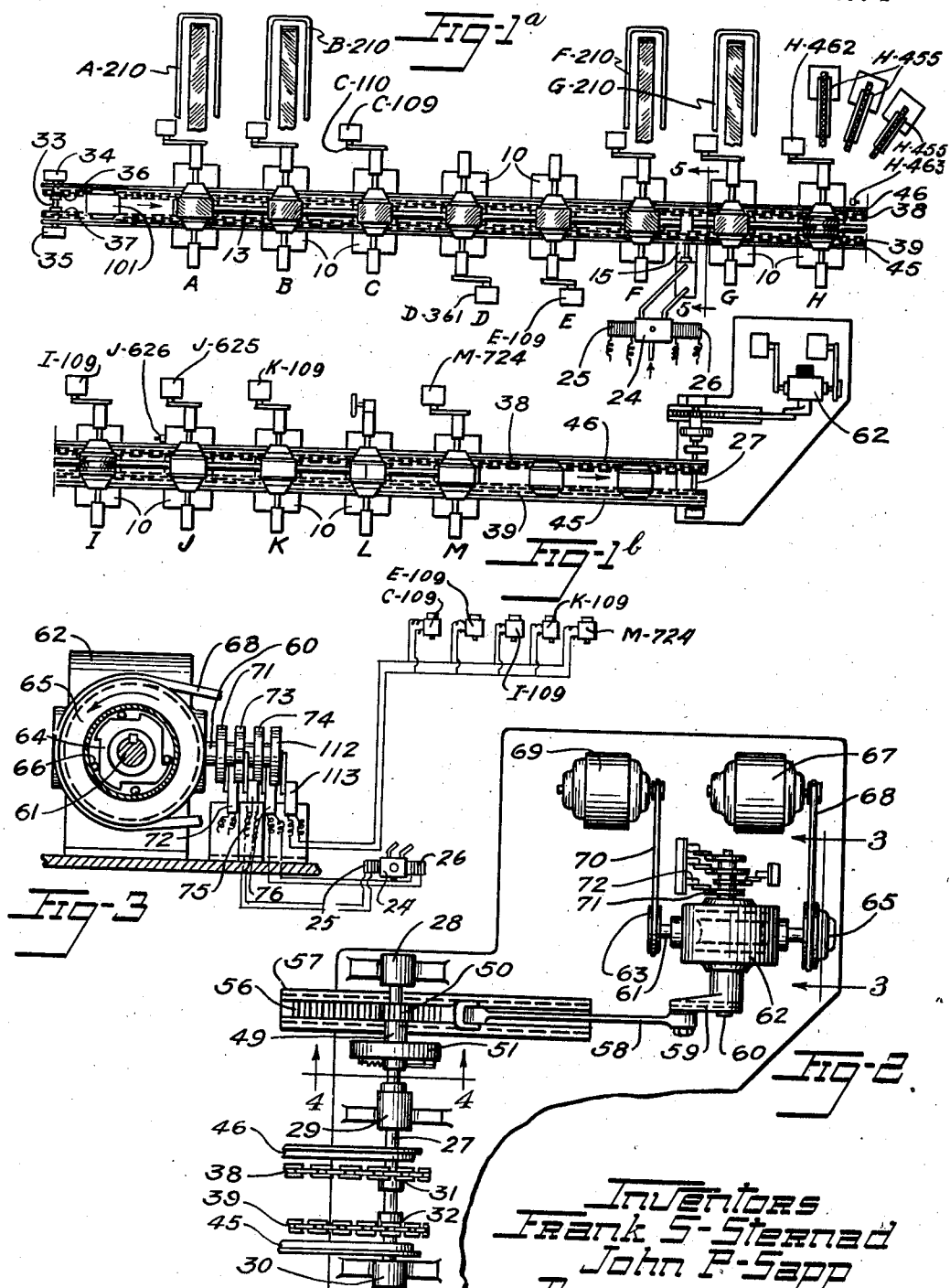

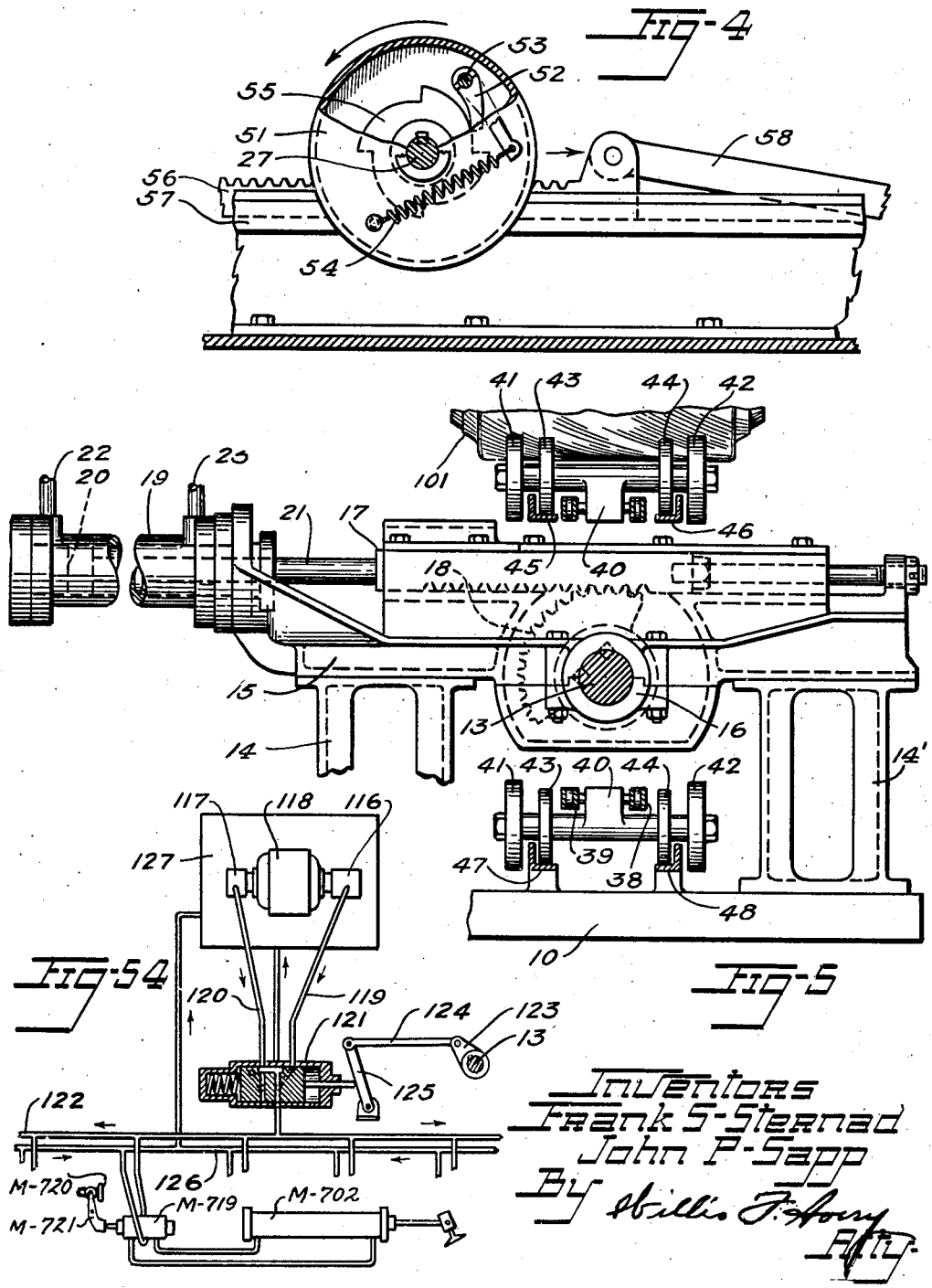

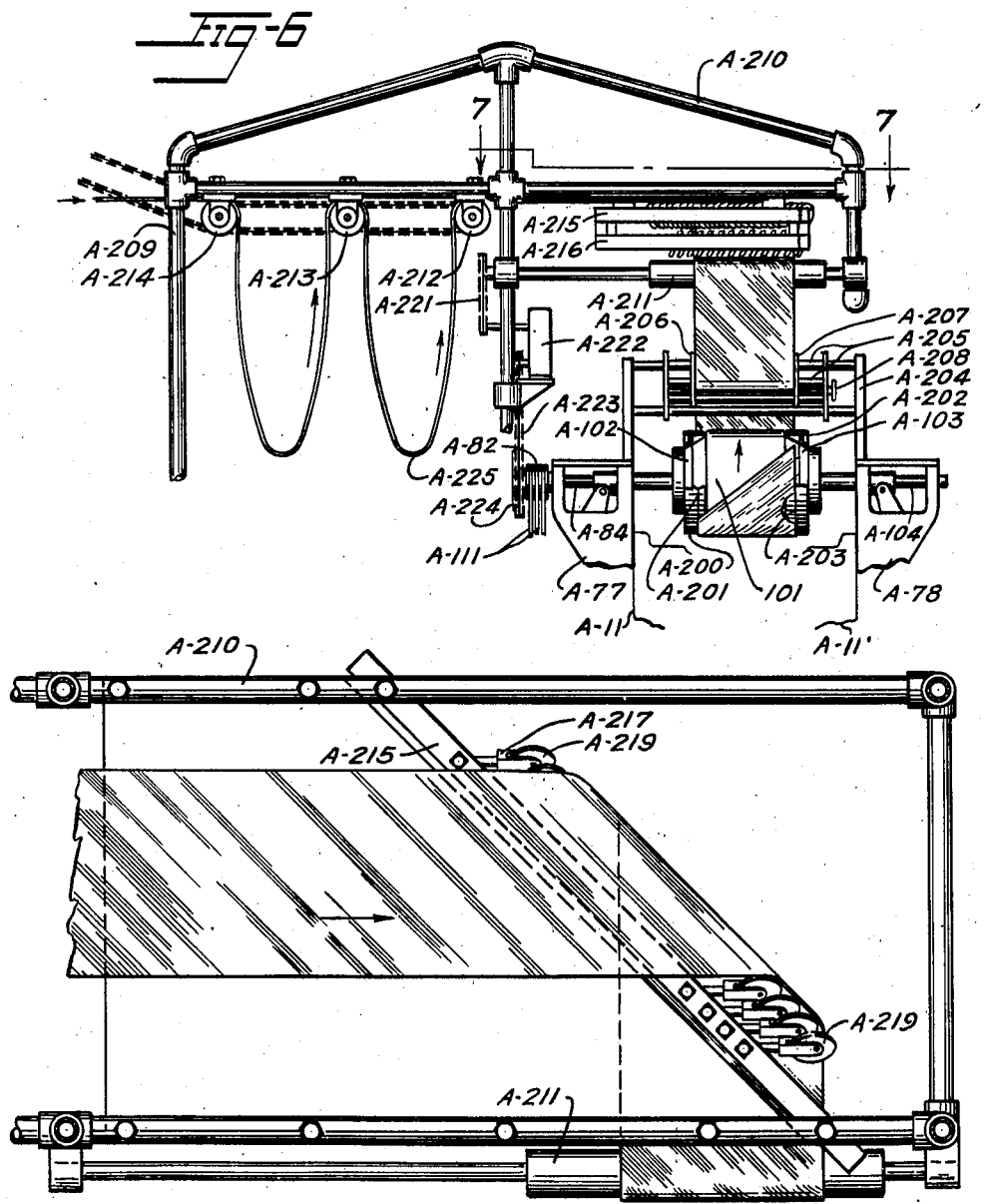

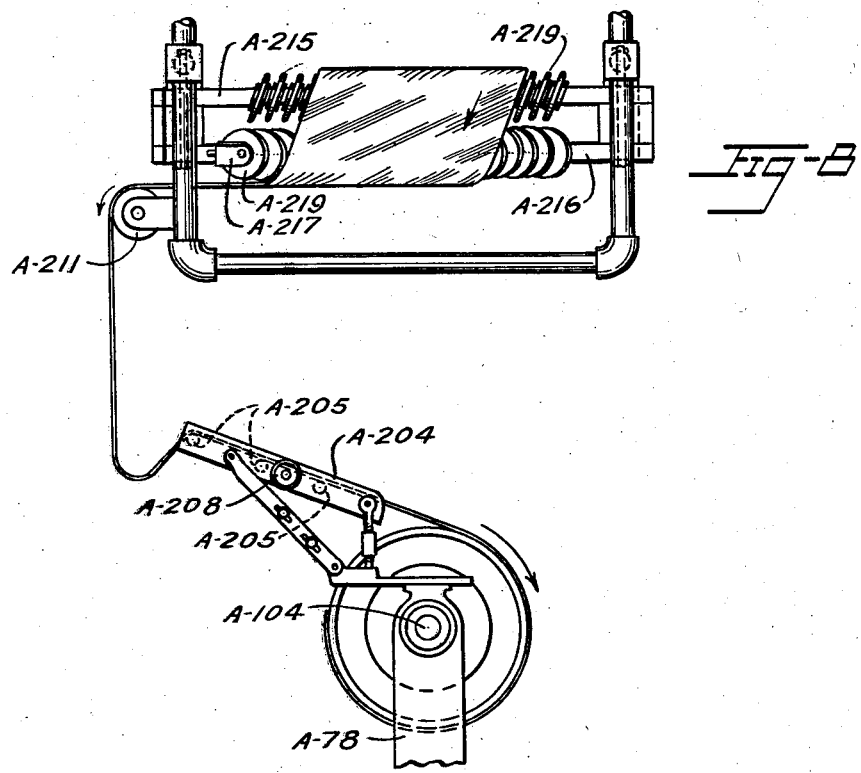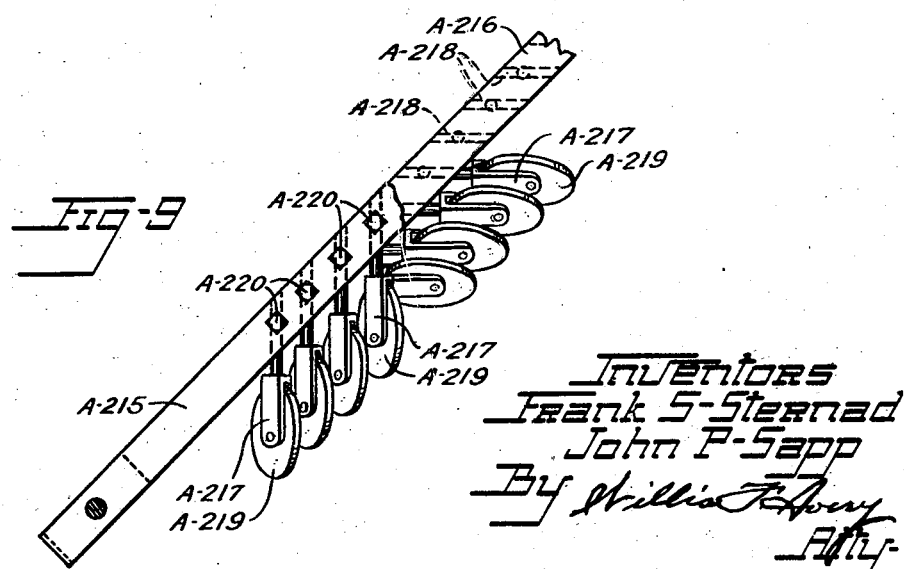

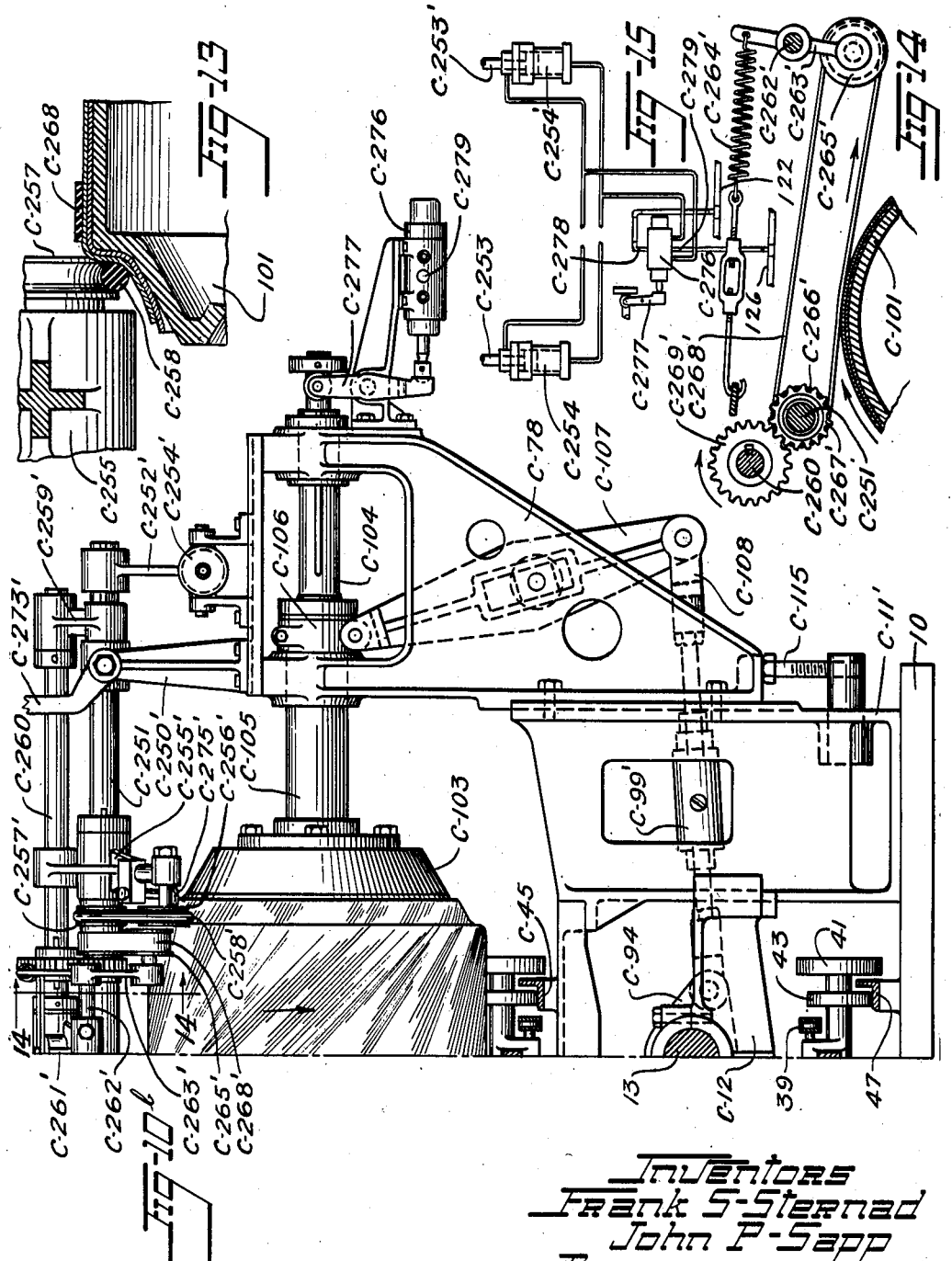

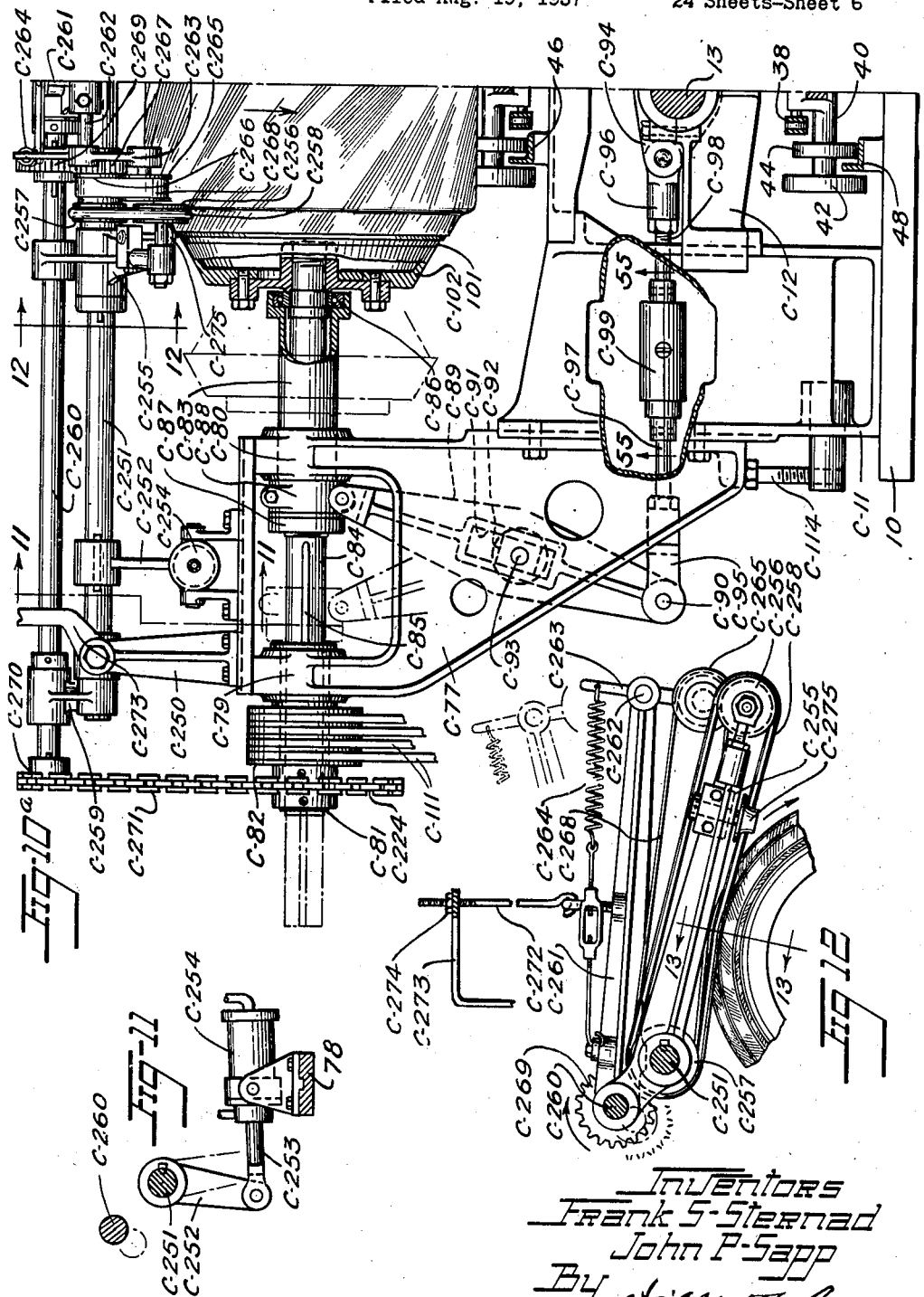

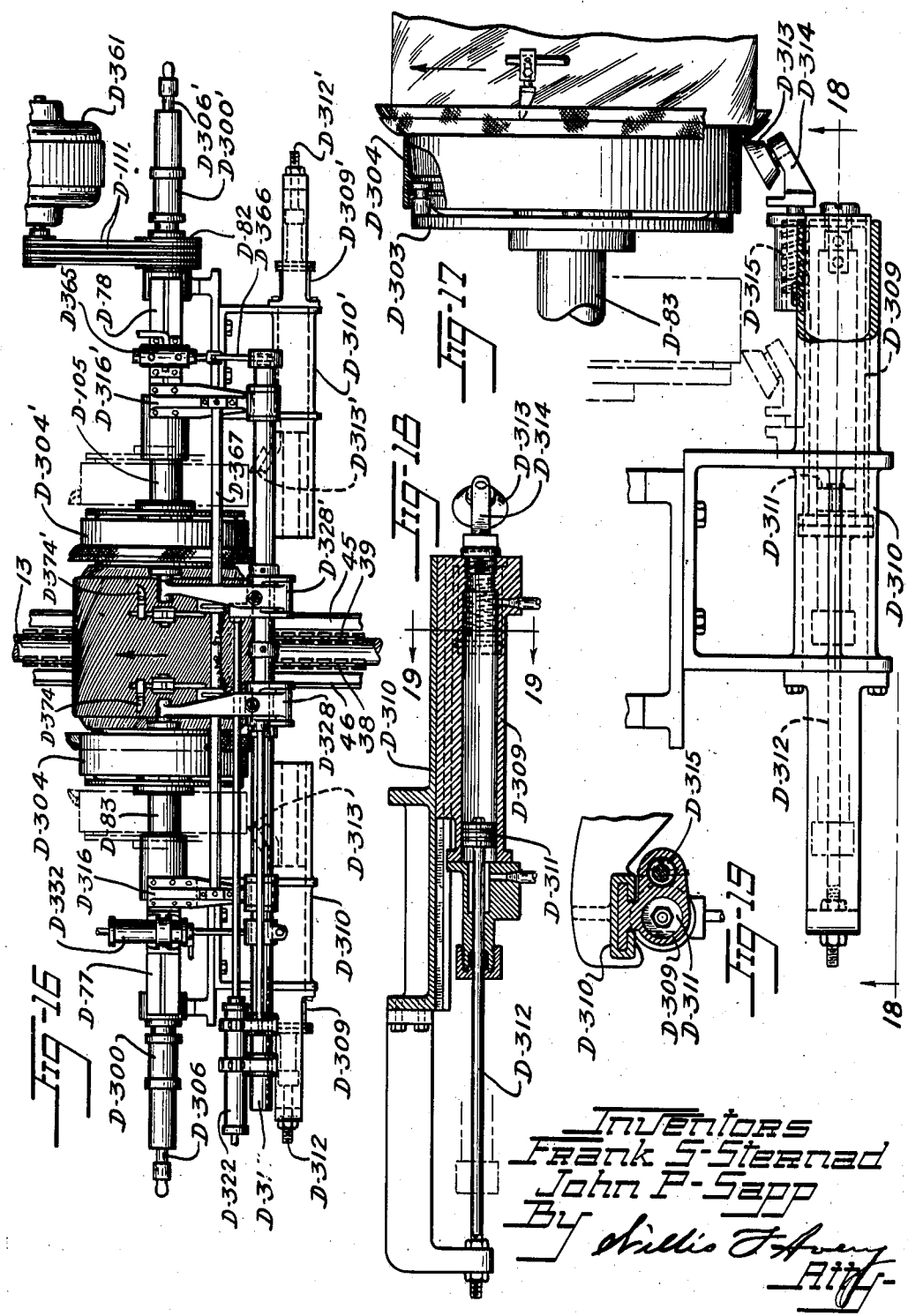

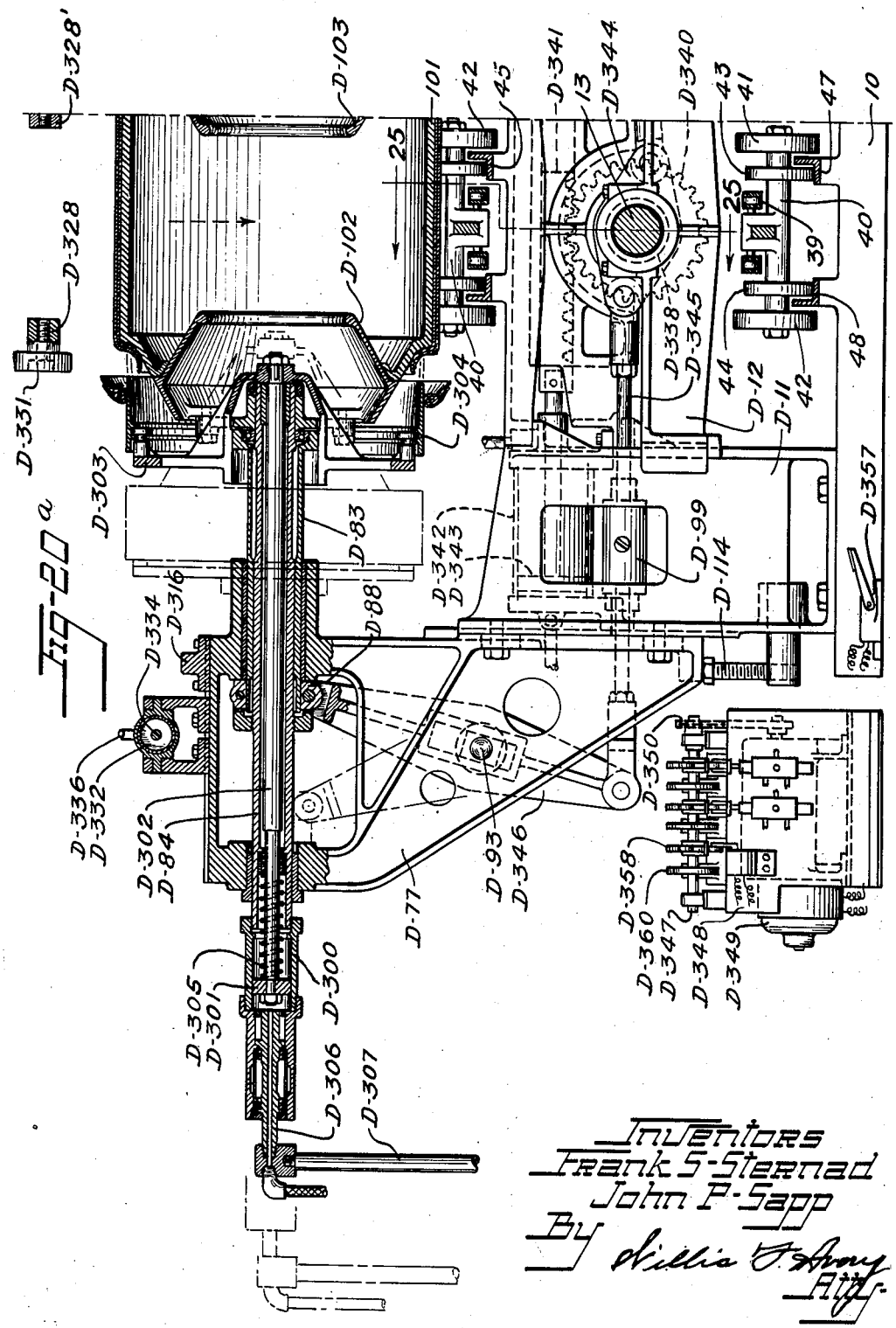

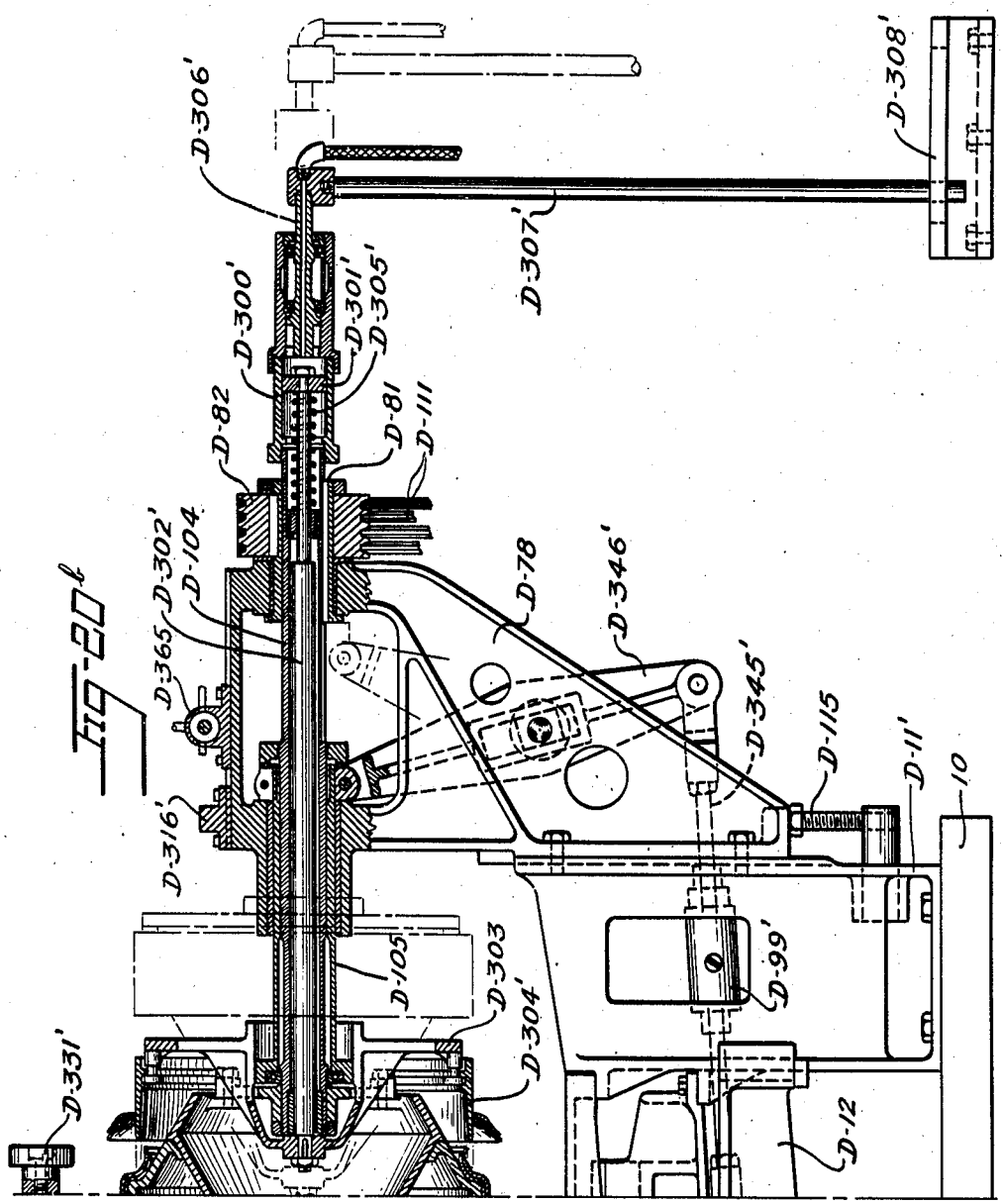

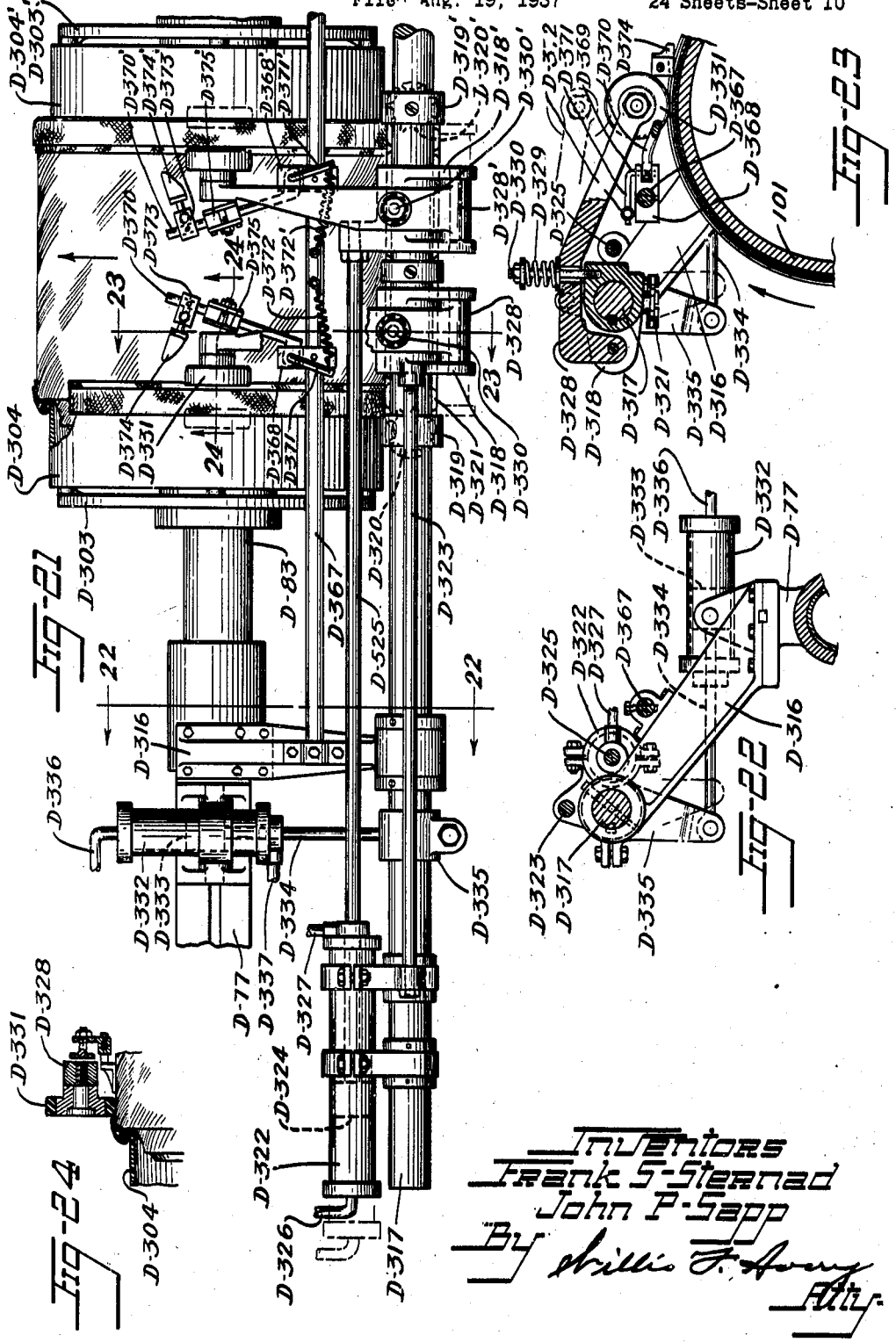

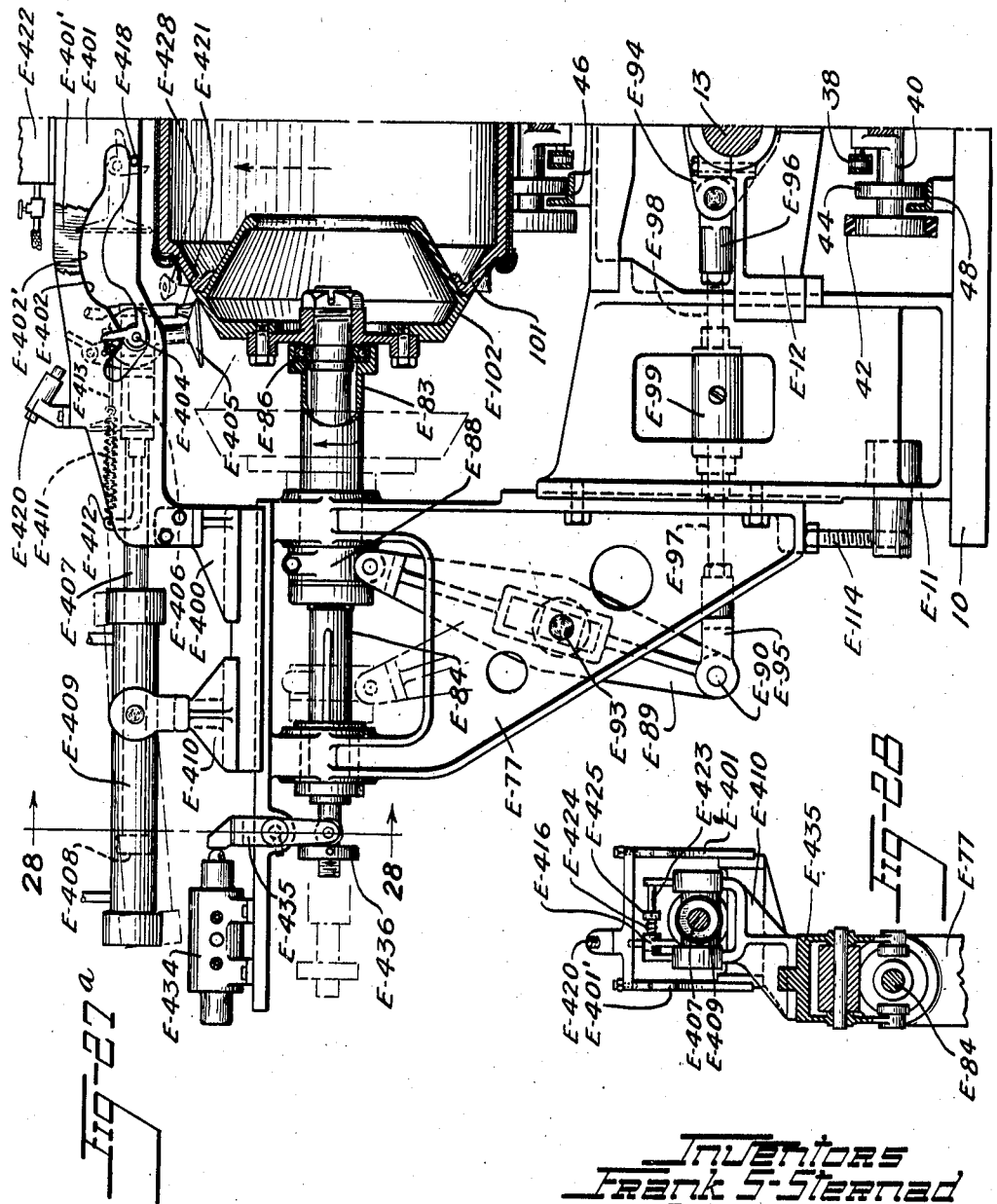

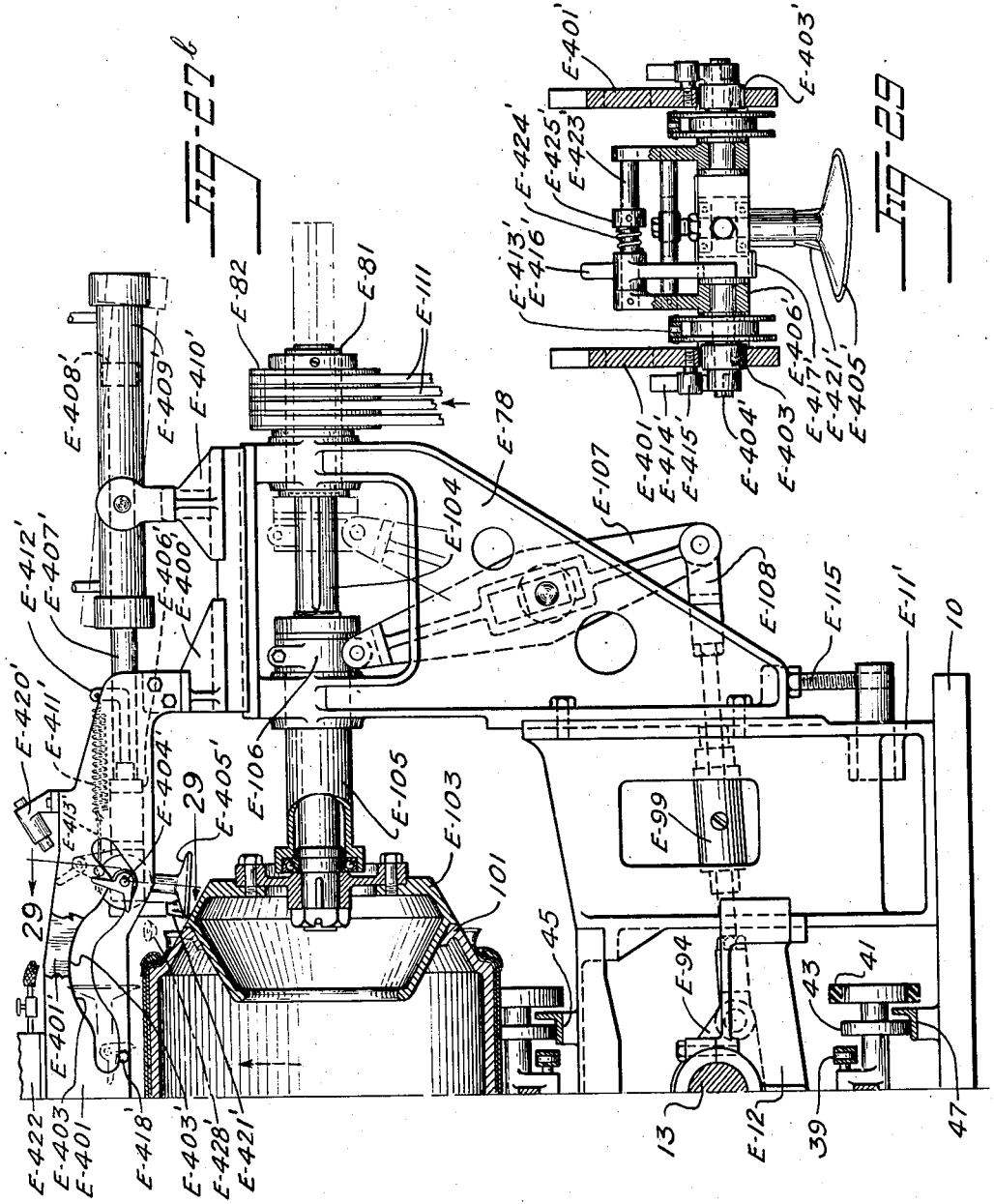

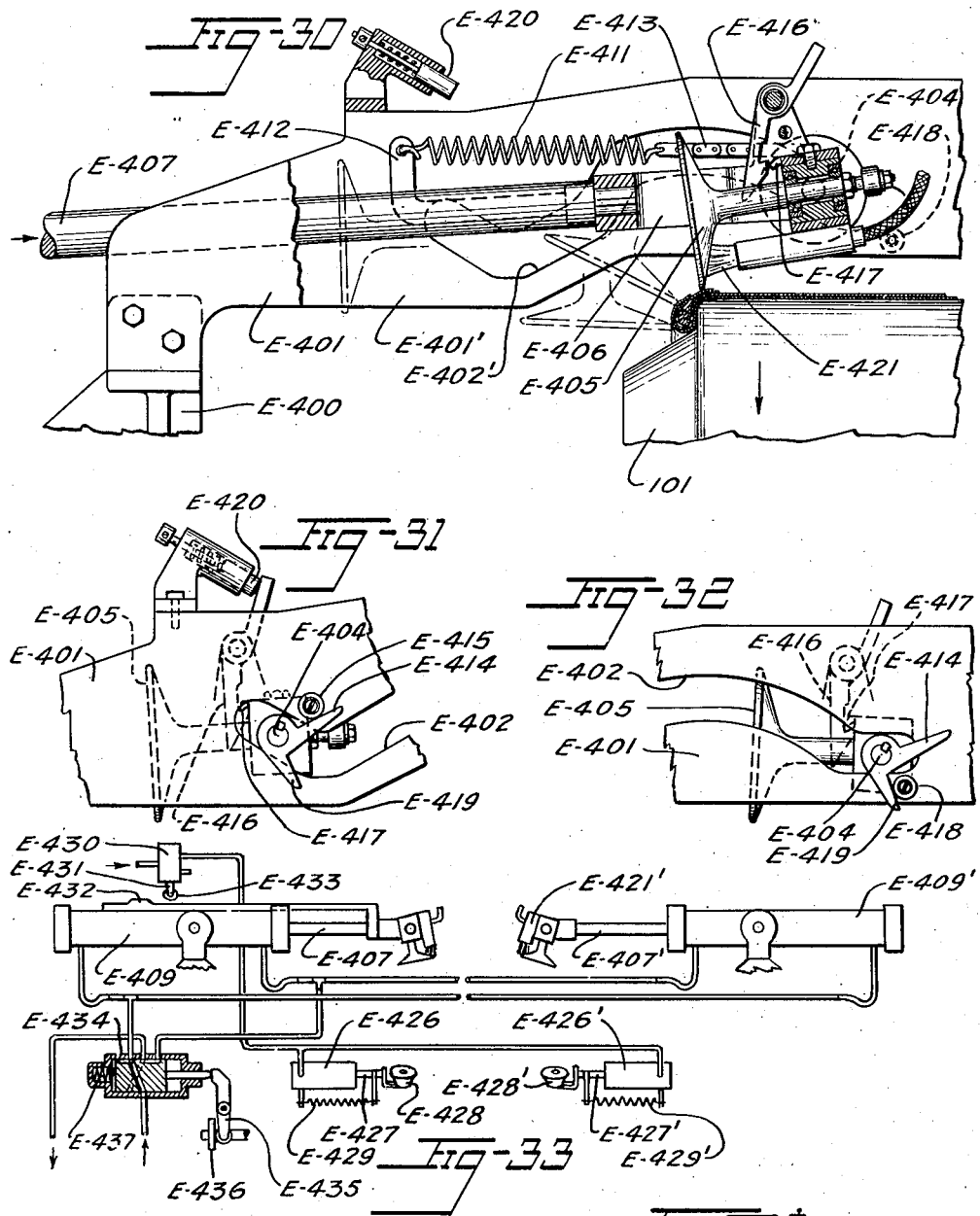

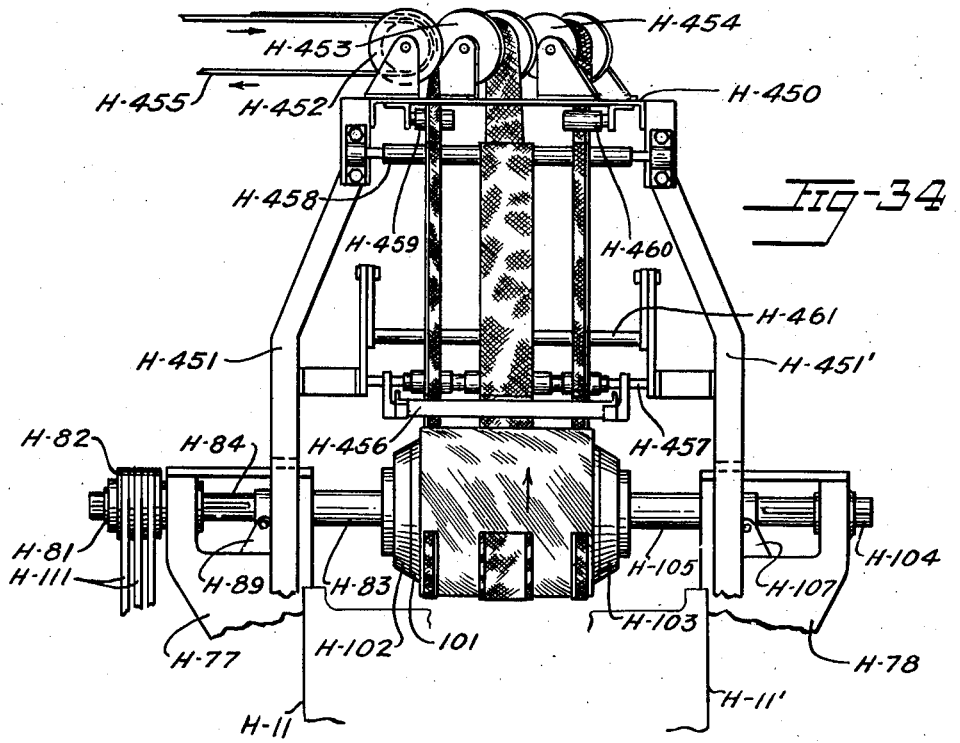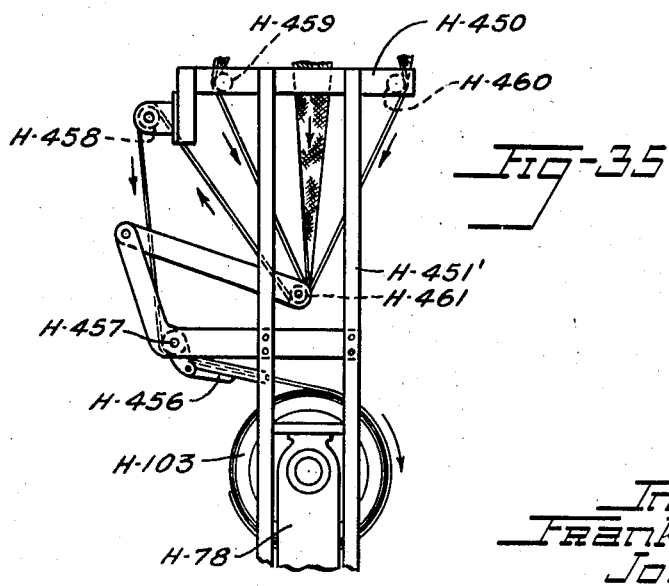

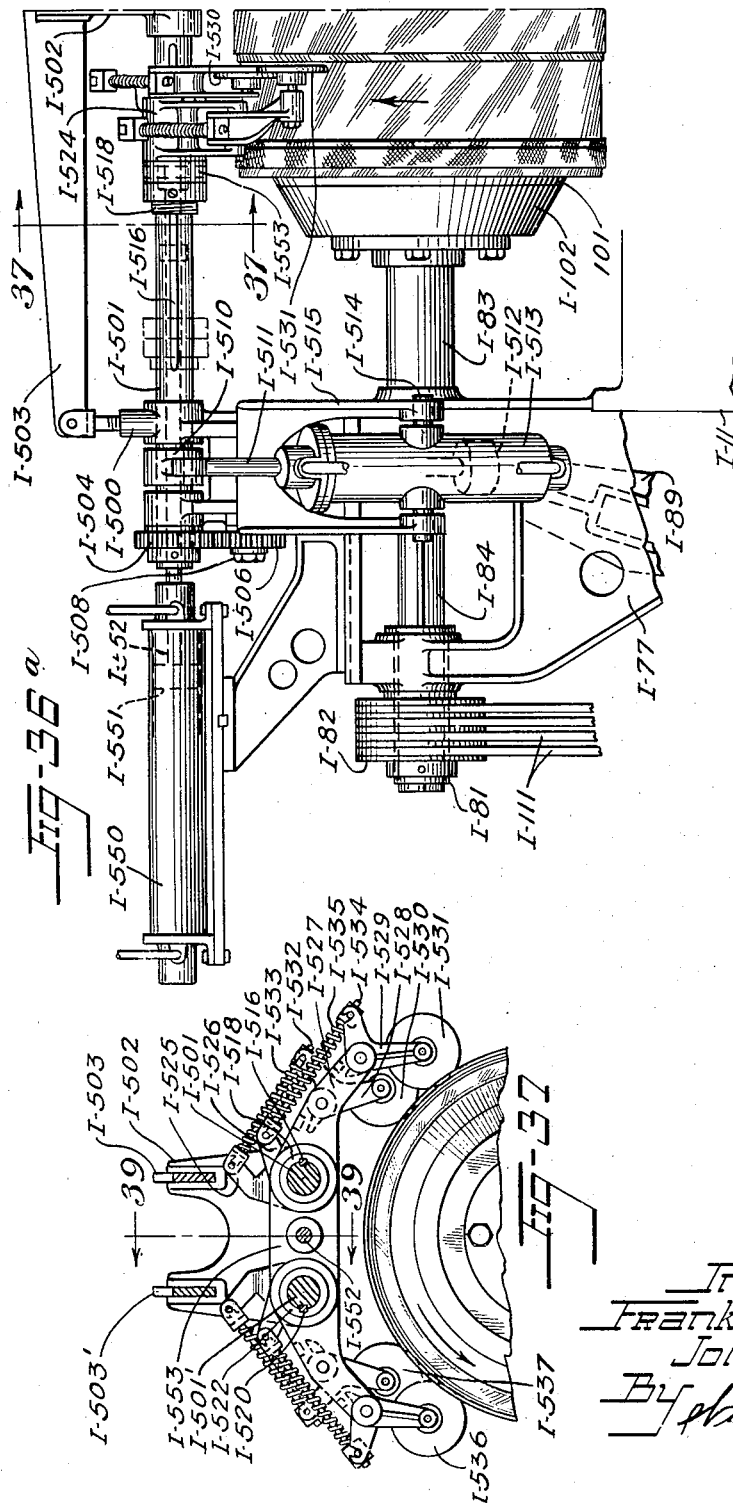

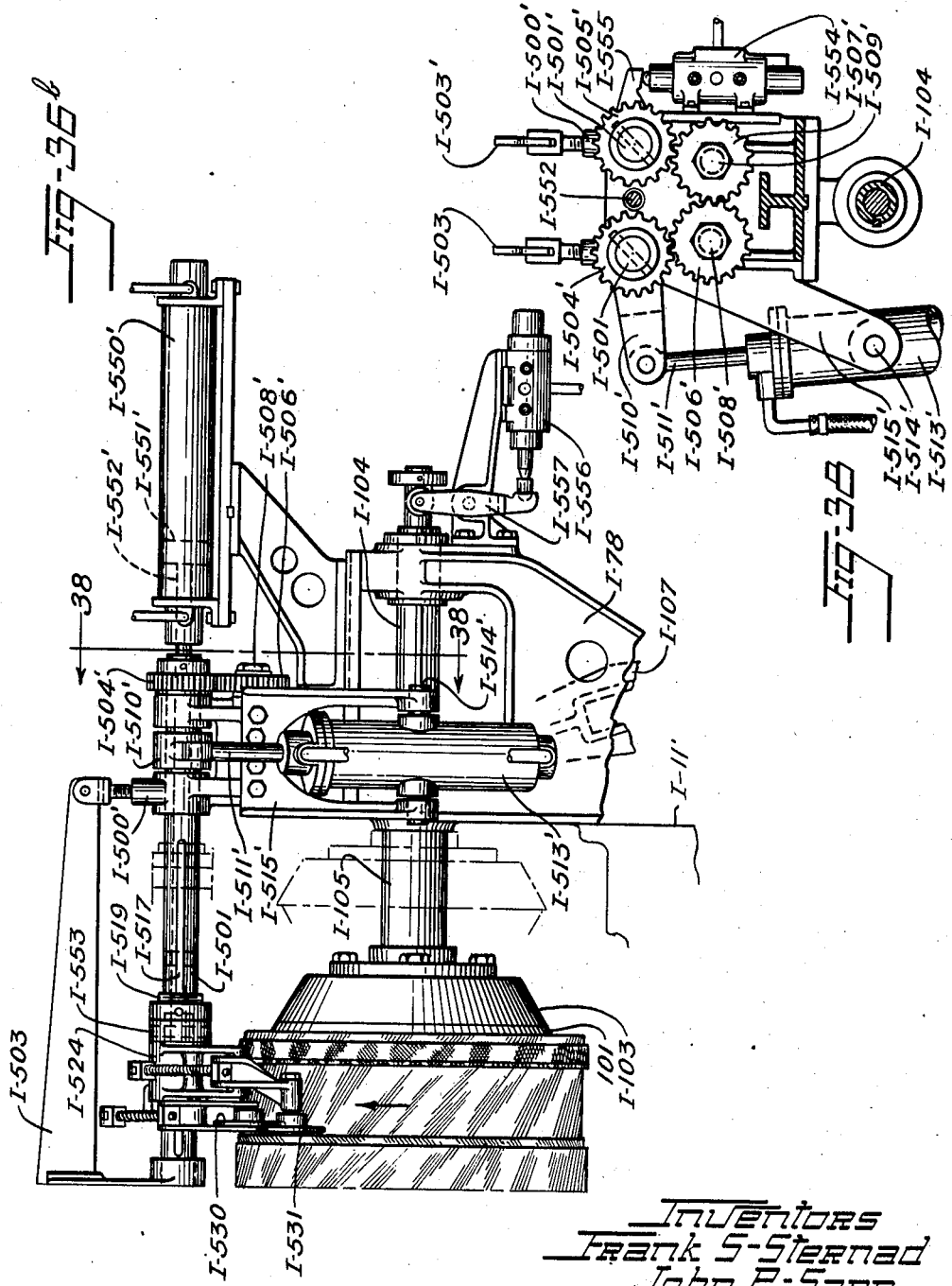

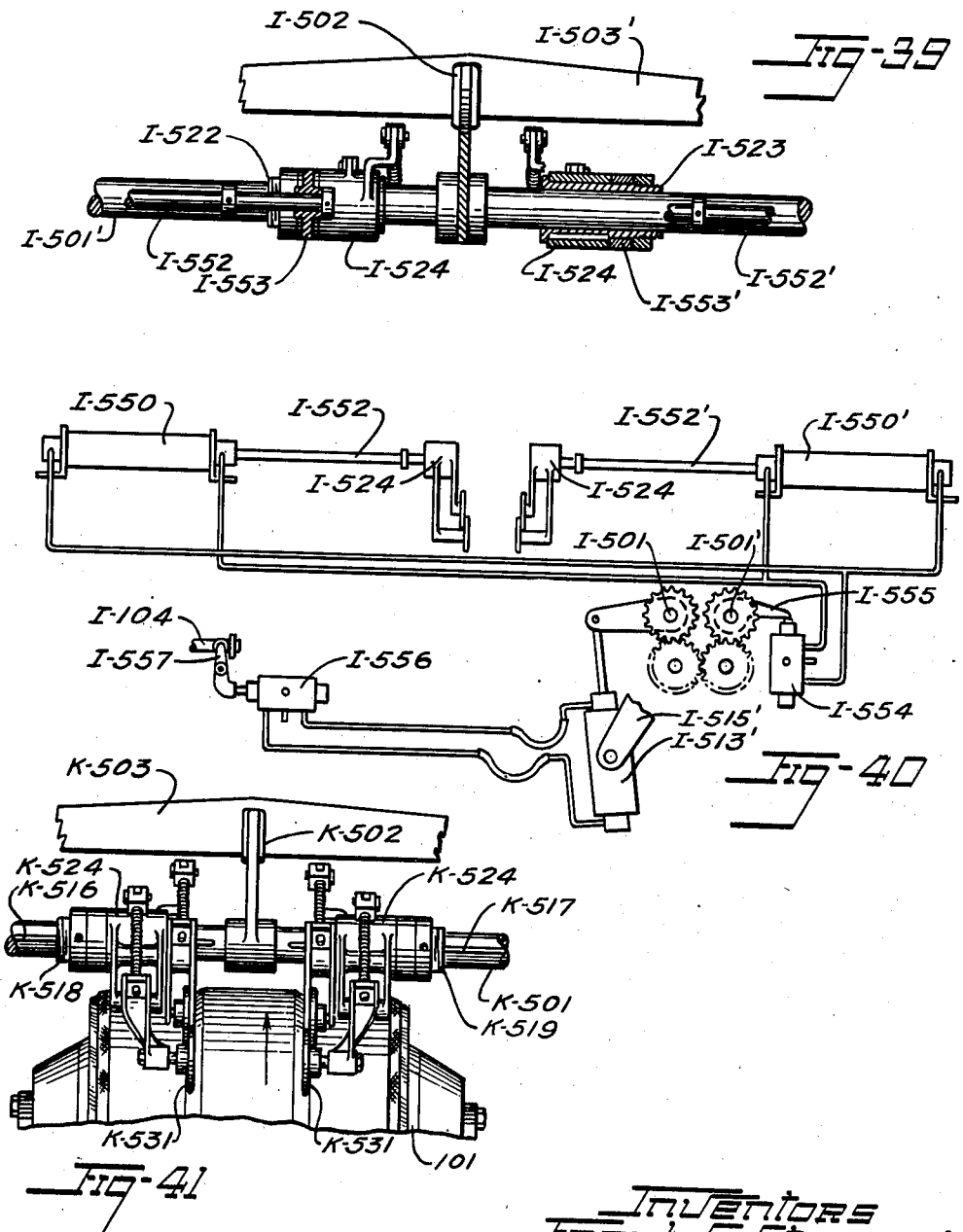

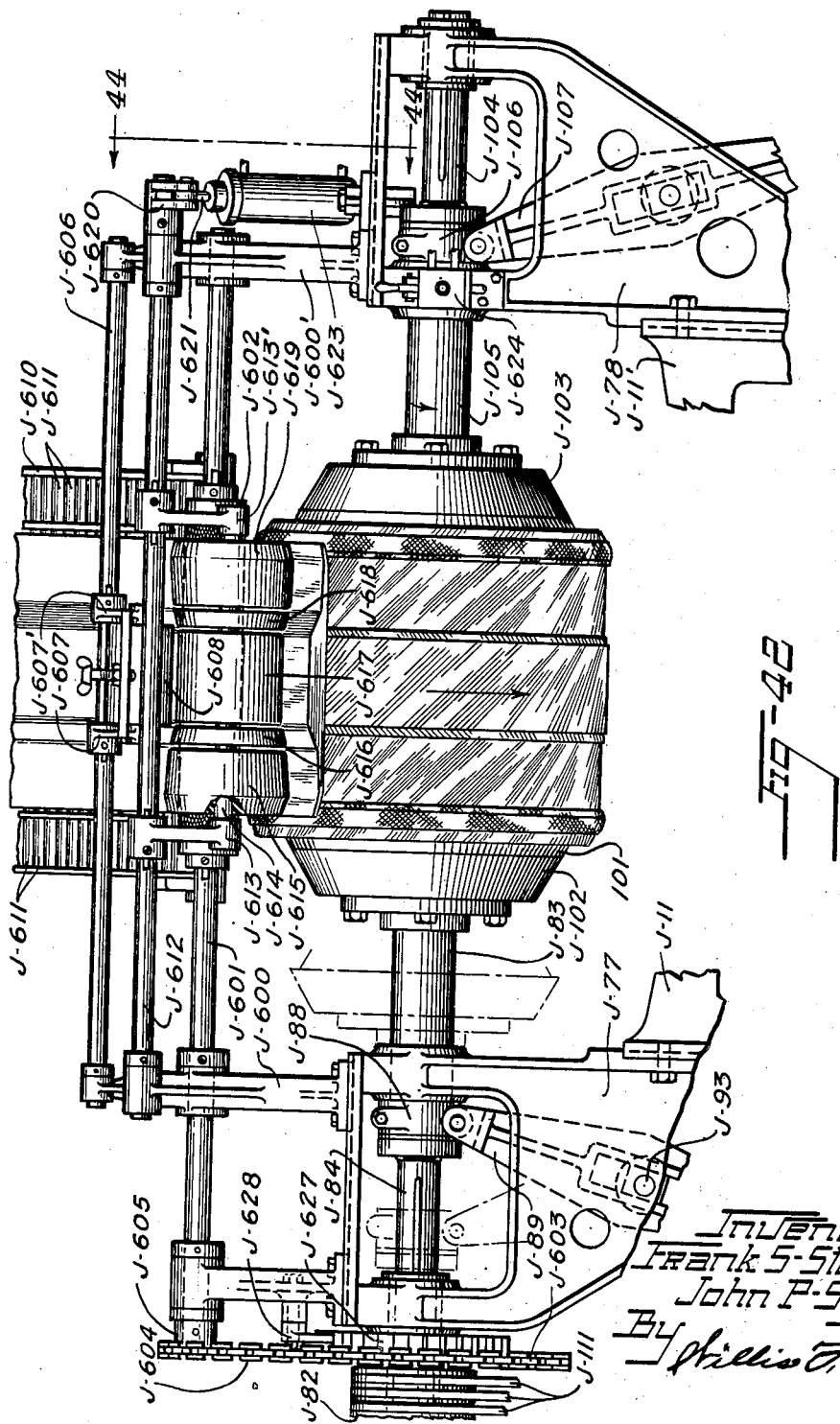

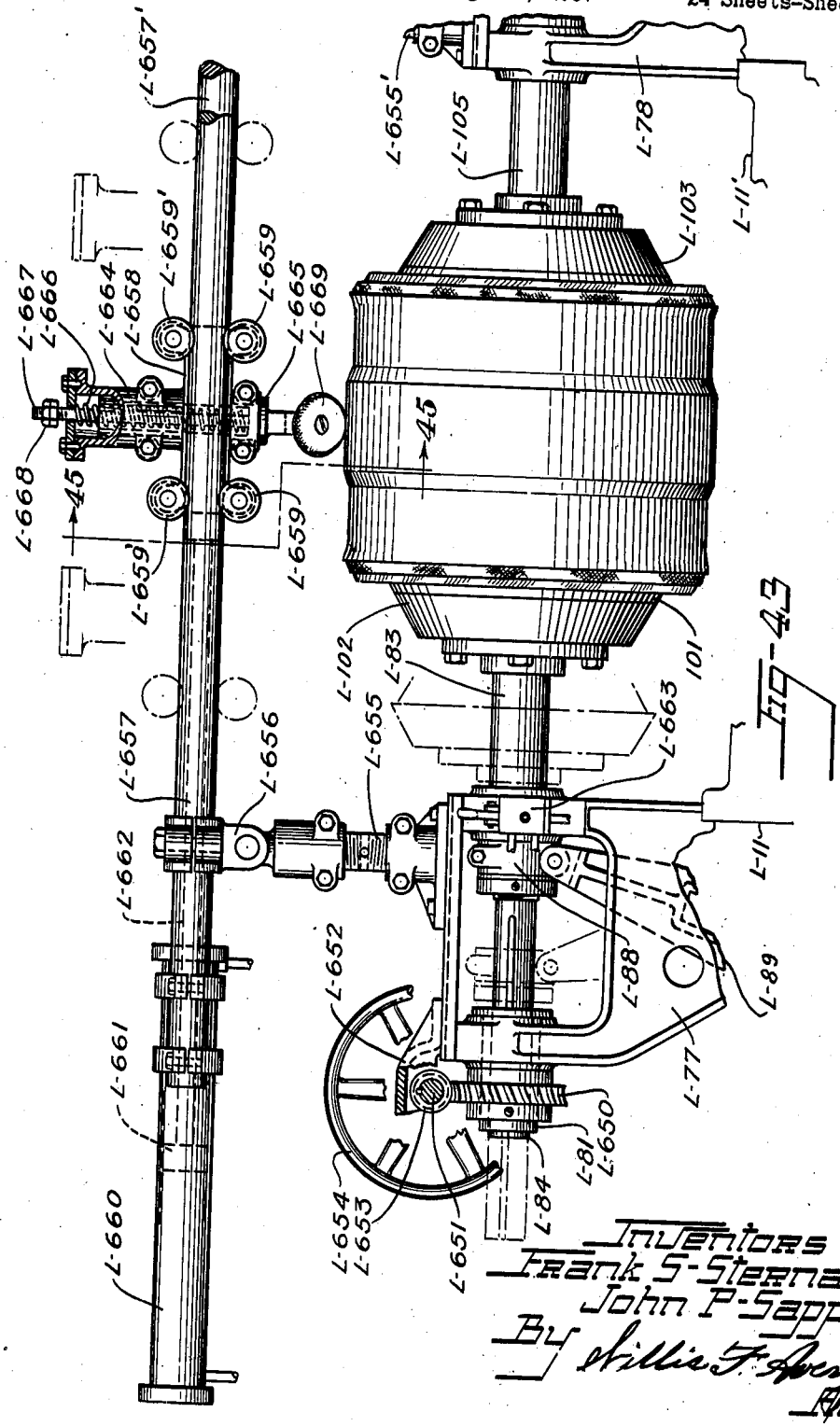

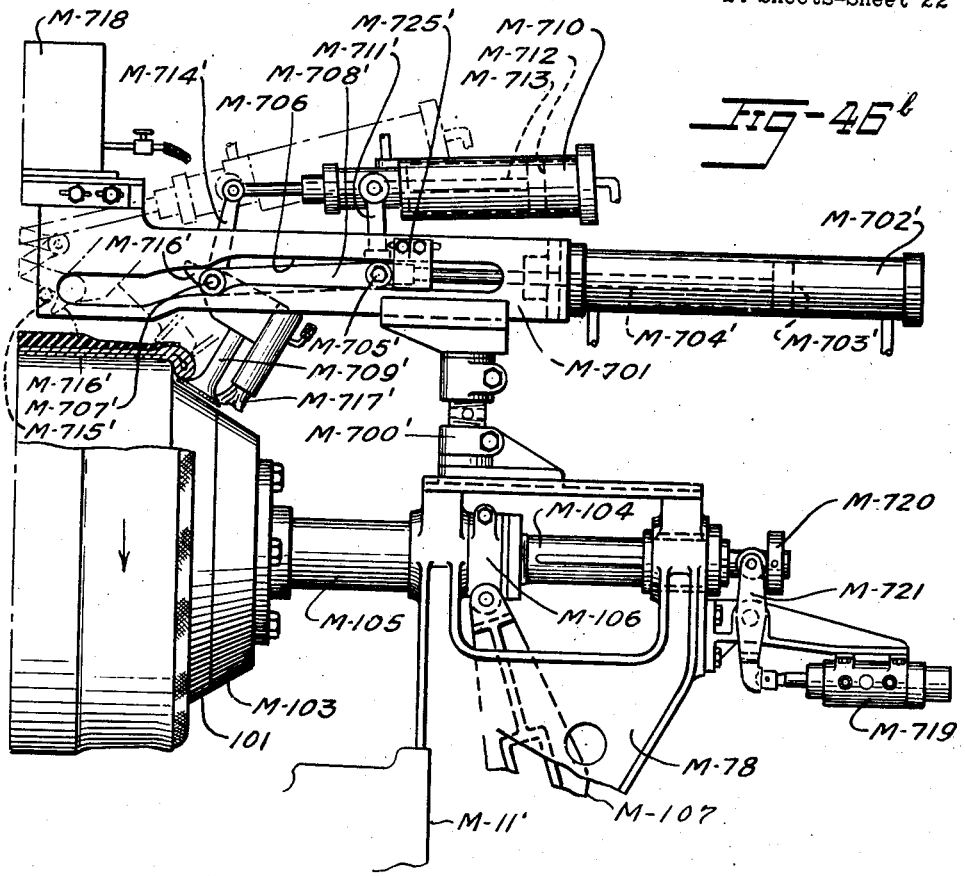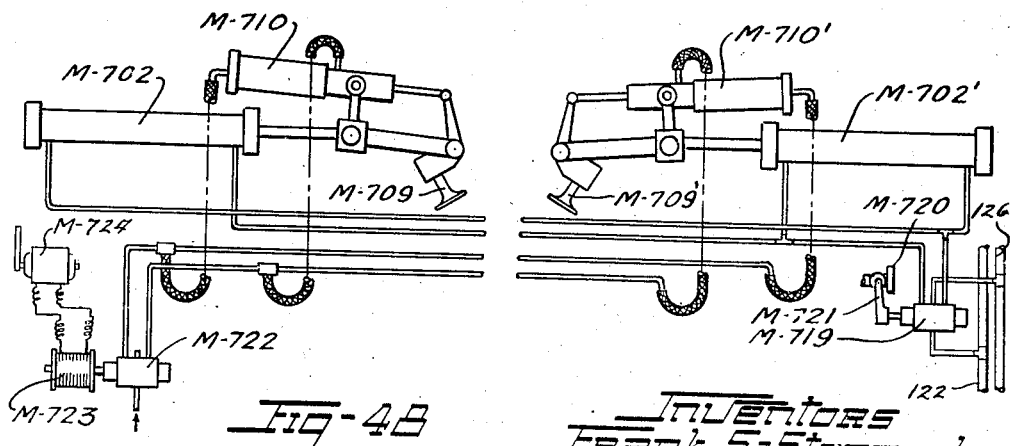

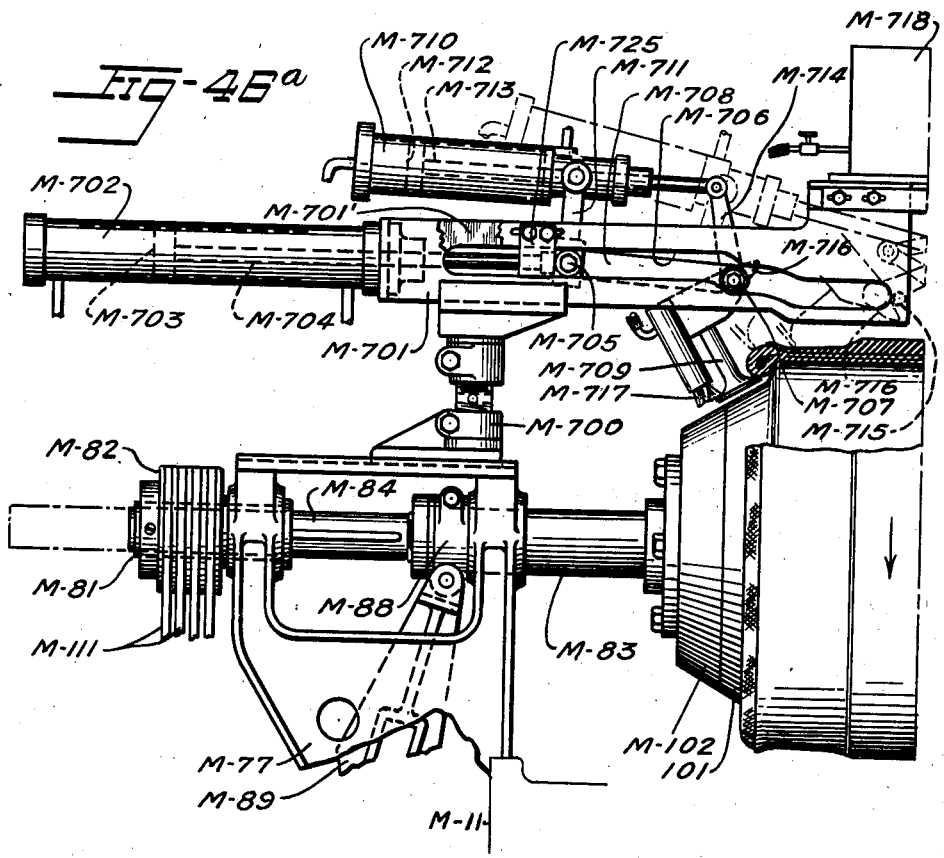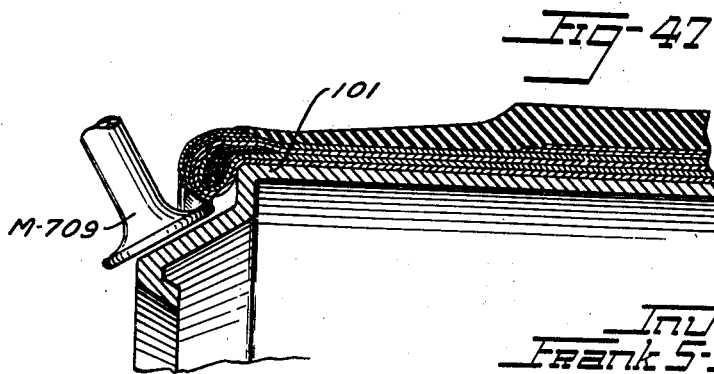

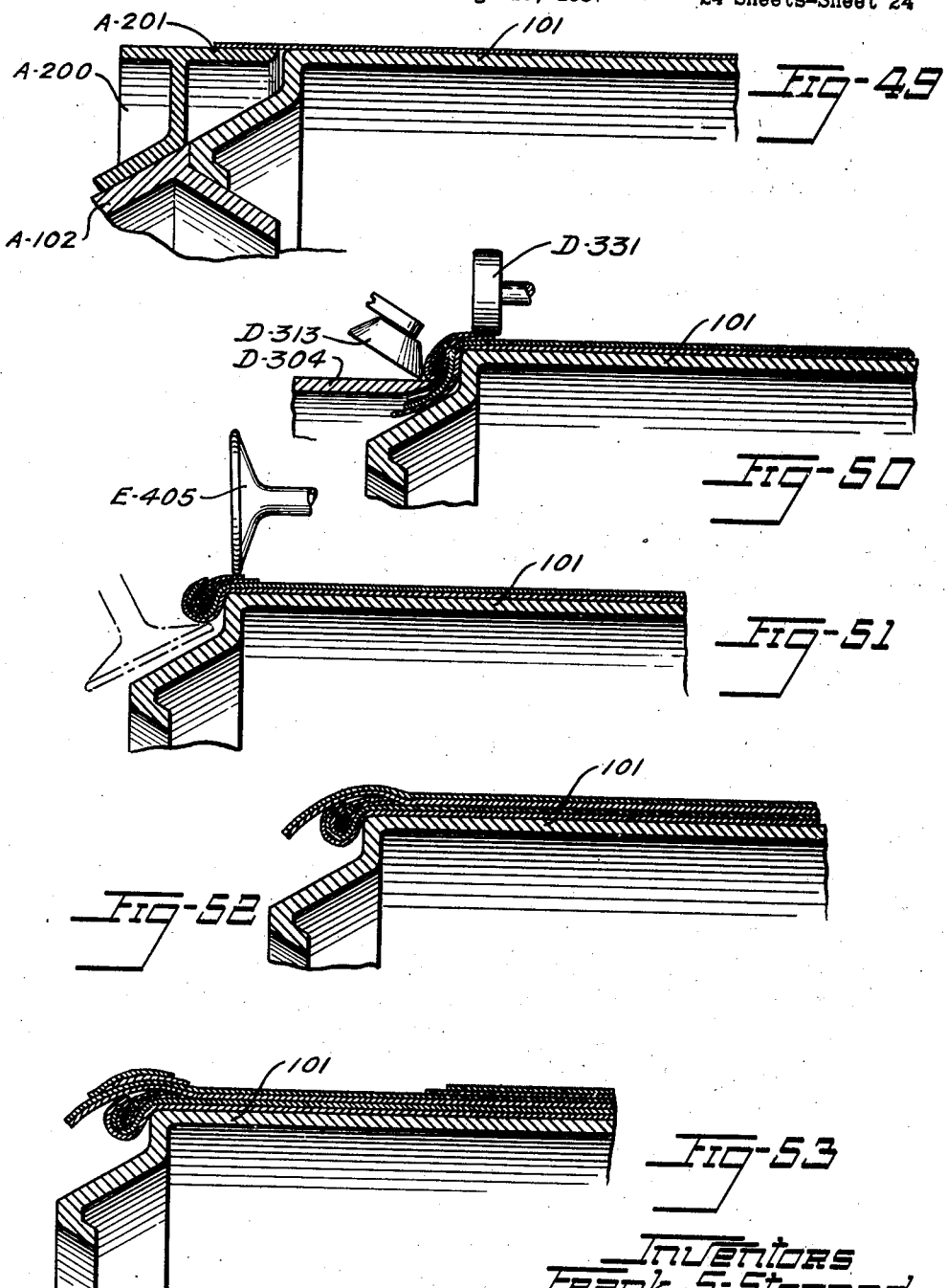

Patented May 18, 1943

2,319,643

UNITED STATES PATENT OFFICE 2,319,643

PNEUMATIC TIRE MACHINE

Frank S. Sternad, Cuyahoga Falls, and John P. Sapp, Kent, Ohio, assignors to The B. F. Goodrich Company, New York, N. Y., a corporation of New York Application August 19, 1937, Serial No. 159,906

25 Claims. (Cl. 154—10)

This invention relates to methods and apparatus for building pneumatic tires, and more especially to methods and apparatus for building the tires in band form preliminary to the shaping and vulcanization of the same.

The principal objects of the invention are to provide convenience and economy of procedure, to provide continuity of operation, to provide accuracy and uniformity of operation, to provide control of the period of the cycle of operation, to provide automatic cycle control combined with flexibility of individual step control, to provide for the manufacture of tires of different sizes with a minimum number of adjustments of mechanism, to provide adjustability to changes in tire specification, to provide accommodation to variation in drum dimensions, and to permit manual inspection and manipulation during the operation. These and other objects will appear from the following description and the accompanying drawings.

Of the drawings:

Figs. 1ª and 1ᵇ, Fig. 1ᵇ being a continuation of Fig. 1ª, constitute a general plan view of the apparatus of the invention in its preferred form.

Fig. 2 is an enlarged plan view of the conveyor driving mechanism.

Fig. 3 is a detail sectional view thereof taken on line 3—3 of Fig. 2, parts being broken away.

Fig. 4 is another detail sectional view thereof, taken on line 4—4 of Fig. 2, parts being broken away.

Fig. 5 is a detail sectional view of the chuck actuating mechanism, taken on line 5—5 of Fig. 1, the drum conveyor with a drum thereon also being shown, parts being broken away.

Fig. 6 is a side elevation of one of the fabric delivery units, showing one of the drums, the fabric guiding mechanism, and the upper part of a fabric applying unit, employed at stations A, B, F, and G, other parts being broken away.

Fig. 7 is a sectional plan view of the fabric delivery unit taken on line 7—7 of Fig. 6 and showing the quarter-turn guiding device, other parts being broken away.

Fig. 8 is an end elevation of the delivery unit of Fig. 6, taken from the right hand side of Fig. 6 and showing the fabric guiding mechanism, and the fabric being applied to the drum at one of the delivery stations, parts being broken away.

Fig. 9 is a detail view of the quarter turn guide.

Figure 25:
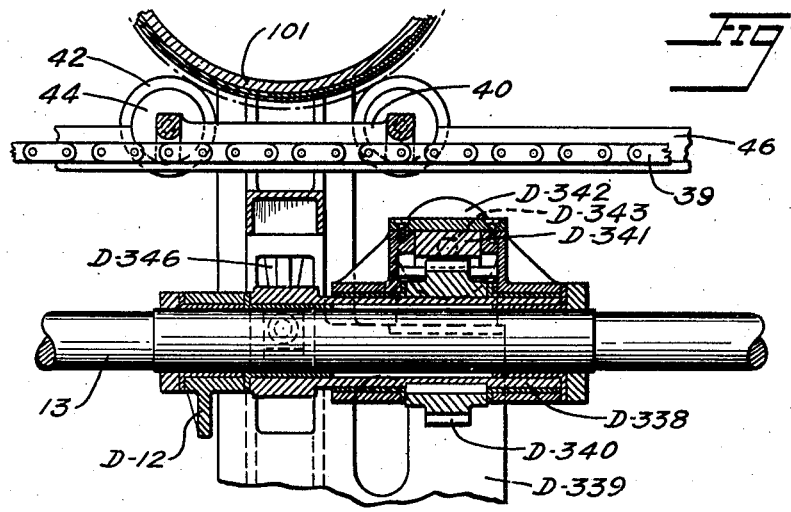

Fig. 10ª is an elevation, partly in section, of which Fig. 10ᵇ is a continuation, showing the fabric turn-down unit at station C with a drum in operating position, also showing the chucking mechanism, the drum conveyor, and the chuck driving mechanism, the retracted position of the left-hand driving cone and its actuating shifter being indicated in dot and dash lines, parts being broken away and parts shown in section to show their construction, the view being taken in the direction of travel of the conveyor.

Fig. 10ᵇ is a continuation of the same.

Fig. 11 is a detail sectional view, taken on line 11—11 of Fig. 10ª, showing the cylinder for rocking the turn-down mechanism toward and from the drum, other parts being broken away and parts shown in section.

Fig. 12 is a sectional detail elevation of the turn down mechanism, at station C, taken on line 12—12 of Fig. 10ª, the elevated position of the parts being indicated by dot and dash lines, a part of the drum with the fabric thereon being also shown, other parts being broken away.

Fig. 13 is a sectional detail view taken on line 13—13 of Fig. 12, diametrically of the drum, and showing the turn-down tools in operation upon the fabric on the drum, other parts being broken away.

Fig. 14 is a sectional detail view of the turn-down tools, taken on line 14—14 of Fig. 10ᵇ, part of the drum being shown in section.

Fig. 15 is a diagrammatic detail view showing the fluid pressure connections for the turn-down rocking cylinders and their operating control valve.

Fig. 16 is a plan view of the bead setting unit at station D, showing the drum and part of the drum conveyor, parts being broken away.

Fig. 17 is a detail plan view to a larger scale, showing a bead setting ring, a part of the drum, and the bead setting roller and its operating mechanism, other parts being broken away, the retracted position being indicated in dot and dash lines.

Fig. 18 is a sectional detail view of the bead setting roller mechanism taken on line 18—18 of Fig. 17, other parts being broken away.

Fig. 19 is a detail cross-section thereof taken on line 19—19 of Fig. 18, other parts being broken away.

Fig. 20ª, of which Fig. 20ᵇ is a continuation, is an elevation, partly in cross section, looking in the direction of travel of the conveyor of the bead setting unit, the bead-placing rings being shown in partially advanced position and their retracted and advanced positions being indicated in dot and dash lines, the drum with a partially completed tire being shown as clutched by the unit, parts being broken away.

Fig. 20ᵇ is a continuation of Fig. 20ᵃ.

Fig. 21 is a plan view, to a larger scale, of part of the bead setting unit showing particularly the mechanism for stitching down the flipper strips, other parts being broken away, the retracted positions of the stitching rollers being indicated by dot and dash lines.

Fig. 22 is a detail cross sectional view, taken on line 22—22 of Fig. 21 and illustrating the stitcher arm rocking mechanism.

Fig. 23 is a detail cross sectional view taken on line 23—23 of Fig. 21, the raised position of the stitcher rolls being indicated in dot and dash lines.

Fig. 24 is a detail sectional view, taken on line 24—24 of Fig. 21 showing a portion of the drum shoulder with the under-bead plies of fabric in place, the bead placing ring, the bead thereon, and one of the stitching rollers.

Fig. 25 is a cross-sectional detail view of the cone chucking mechanism at the bead placing station taken on line 25—25 of Fig. 20ᵃ, the drum and drum conveyor being also shown, other parts being broken away.

Figure 26:
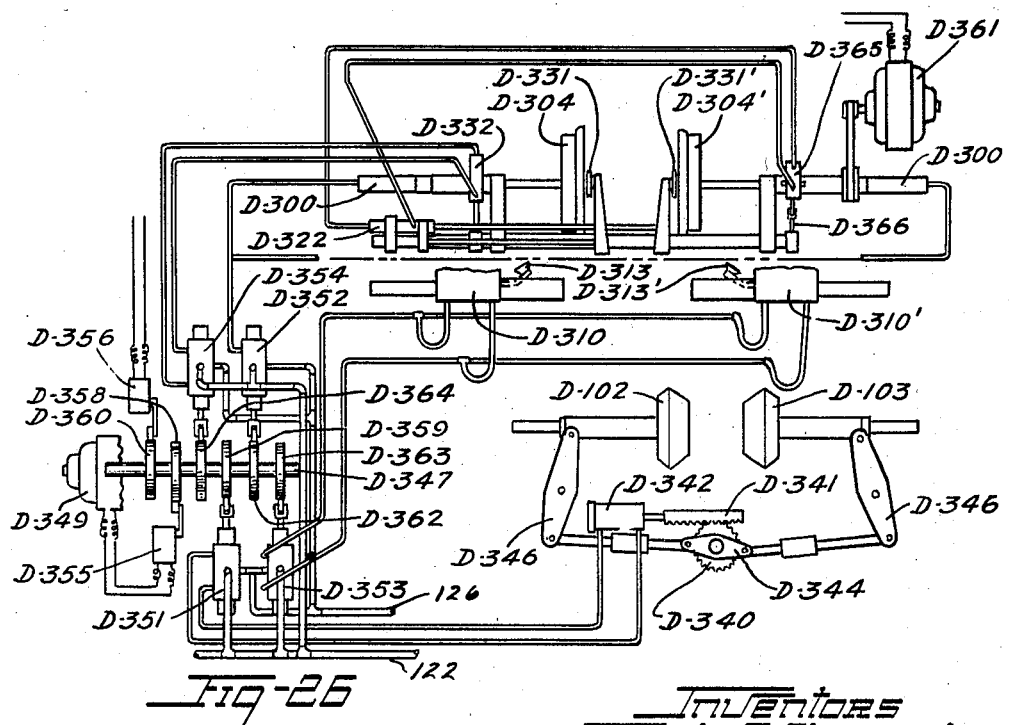

Fig. 26 is a diagrammatic plan of the bead setting unit, showing the operating valves and pipe connections, the motors and their switches, and the control cams.

Fig. 27ᵃ, of which 27ᵇ is a continuation, is an elevation, partly in section, showing the under-bead ply turn-up unit at station E looking in the direction of travel of the conveyor, with the drum in place, the retracted positions of the chucks being indicated in dot and dash lines.

Fig. 27ᵇ is a continuation thereof.

Fig. 28 is a detail cross-sectional view thereof taken on line 28—28 of Fig. 27ᵃ.

Fig. 29 is a detail sectional view of the turn-up stitcher, taken on line 29—29 of Fig. 27ᵇ.

Fig. 30 is a detail view of the turn-up stitcher near the end of its operation, drawn to an enlarged scale, other successive preceding positions of the stitcher wheel being indicated by dot and dash lines, other parts being broken away.

Fig. 31 is another detail view of the same with the stitcher in its retracted position, other parts being broken away.

Fig. 32 is another view of the same with the stitcher in its most advanced position, other parts being broken away.

Fig. 33 is a diagrammatic plan of the under-bead ply turn-up unit showing the operating piping connections and valve.

Fig. 34 is an elevation of the breaker strip and chafing strip applying unit at station H, looking in the direction of travel of the conveyor, the lower part of the unit being broken away and the strips being shown as being applied.

Fig. 35 is an elevation of the same taken from the right side of Fig. 34, parts being broken away.

Fig. 36ᵃ, of which Fig. 36ᵇ is a continuation, is an elevation of the band stitching unit used to stitch the fabric carcass at station I and also to stitch the tread thereto at station K, the lower part of the unit being broken away, the view being taken looking in the direction of travel of the conveyor.

Fig. 36ᵇ is a continuation of the same.

Fig. 37 is a cross sectional view, taken on line 37—37 of Fig. 36ᵃ.

Fig. 38 is a cross sectional detail view, taken on line 38—38 of Fig. 36ᵇ, parts being broken away, showing the stitcher arm rocking mechanism.

Fig. 39 is a detail sectional view, taken on line 39—39 of Fig. 37 showing the rocker arm mechanism.

Fig. 40 is a diagrammatic view of the stitching unit showing the piping and valve connections.

Fig. 41 is similar to Fig. 36ᵃ and 36ᵇ, but shows the rubber tread applied to the drum at station K and the stitchers operating thereover, other parts being broken away.

Fig. 42 is an elevation of the tread slab applying unit at station J, looking in the direction of travel of the conveyor, showing the drum in place with the tire carcass thereon and the tread being applied thereto, the lower part of the unit and part of the tread guiding means being broken away, the retracted position of one of the chuck cones being indicated in dot and dash lines.

Fig. 43 is an elevation of the tread splice rolling unit at station L, looking in the direction of travel of the conveyor, with the finished tire and drum in operating position, the retracted position of one of the chuck cones and the limit positions of the splice roller carriage being indicated in dot and dash lines, the lower part of the unit and other parts being broken away.

Fig. 44 is a detail sectional view of the tread applying unit, taken on line 44—44 of Fig. 42.

Fig. 45 is a detail sectional view of the tread-splice rolling unit, taken on line 45—45 of Fig. 43.

Fig. 46ᵃ, of which Fig. 46ᵇ is a continuation, is an elevation of the over bead turn-down unit at station M, looking in the direction of travel of the conveyor, with the drum and tire band in position, the operative parts being shown in their final stitching position, other positions of the stitching mechanism being indicated in dot and dash lines, part of the tire being broken away and part shown in section, the lower portion of the unit being broken away.

Fig. 46ᵇ is a continuation thereof.

Fig. 47 is a sectional view of the drum and tire to an enlarged scale with the stitching wheel in its final stitching position, parts being broken away.

Fig. 48 is a diagrammatic view of the over-bead turn-down unit showing the hydraulic connections.

Fig. 49 is a fragmentary sectional view of the drum, one of the driving cones at the first fabric applying station, and one of the fabric aligning rings, other parts being broken away, the first ply of fabric being shown in place.

Fig. 50 is a fragmentary sectional view of the drum, the bead setting ring, and the bead applying rollers, with the under bead plies and one of the beads in place, other parts being broken away.

Fig. 51 is a fragmentary sectional view of the drum at the fabric turn-up station, with the under bead plies turned up over the bead, one of the stitcher wheels being shown in full lines at a position near the end of its travel, and in dot and dash lines at the start of its travel, other parts being broken away.

Fig. 52 is a fragmentary sectional view of the drum and tire, showing the over bead plies in place.

Fig. 53 is a similar view showing the breaker strip and chafing strip in place and ready for the tread to be applied.

Fig. 54 is a diagrammatic view showing the fluid pressure supply pumps, the valve for changing the velocity of the fluid supply, and the connecting pipes, parts being broken away.

Fig. 55 is a detail cross-sectional view taken on line 55—55 of Fig. 10ª.

General description

Referring to the drawings, the invention relates to the production of pneumatic tire casings by the drum building process in which all of the elements comprising the tire casing are assembled about a drum which may have substantially the diameter of the beads of the tire and a substantially flat face. The tire bands so produced are later expanded to tire form and are vulcanized in molds while held under internal fluid pressure in contact with the molds.

In practicing the invention in its preferred form, a series of tire building drums are intermittently conveyed in spaced relation, with their axes disposed across the line of travel, past a plurality of chucking stations, where, during the intervals between conveyor movements, the drums are automatically lifted from the conveyor, and centered between driving cones, and various operations comprising applying and rolling the various elements of the tire casing onto the drums, are consecutively performed, the entire task of building the carcass being divided into convenient related steps preferably so coordinated as to be effected in equal increments of time, and the several steps being carried out successively at stations preferably arranged in direct line. Some of the operations may be completed automatically while others are best performed by semi-manual operation under the supervision of operators, while the invention contemplates manual control at each of the stations when desired.

The number of stations required for the building of a tire casing will depend somewhat upon the construction of the tire. For example, upon the number of plies of cords, or other fabric that are to be applied. For a popular size of four ply cord tire the invention in its preferred form contemplates the employment of thirteen operating stations, each feeding station of which is equipped with convenient strip supply means for intermittently supplying the necessary materials, and each manipulating station being equipped with the necessary mechanism for performing the required operations, all properly coordinated. For tires of more than four plies of cords, the number of stations may be increased.

In Figs. 1ᵃ and 1ᵇ which show a general plan view of the apparatus, constructed according to and embodying the invention in its preferred form, the successive operating stations are indicated by the letters A to M. At station A, the first under bead ply of cord fabric is applied to the drum. At station B, the second under-bead ply of cord fabric is applied with its cords crossing the first ply. At station C, the under-bead plies of cord fabric are turned down over the bead shoulders of the drum which are of reduced diameter. At station D, the bead cores, equipped with their surrounding flipper strips, are applied over, and the flipper strips rolled down into engagement with, the cord plies. At station E, the protruding margins of the under-bead plies of cord fabric are turned up over the beads and adhered thereto. At station F the first over-bead ply of cord fabric is applied. At station G, the second over-bead ply of cord fabric is applied. At station H, the breaker strip and chafing strips are fed into place. At station I, the previously applied fabric element are rolled or stitched into place. At station J, the tread slab is fed and rolled into place over the carcass. At station K, the tread is further rolled or stitched into adhesive intimate engagement with the carcass. At station L the tread splice is rolled axially of the drum to knit the ends into intimate adhesive engagement. At station M, the margin of the tread slab, the margin of the over-bead plies, and the chafing strips are stitched down around the beads. The tire is then fully constructed and is ready for removal from the drum and the shaping, molding and vulcanizing operations.

In the application of reference characters to the mechanism, parts local with respect to a work station are designated by a numeral preceded by a letter corresponding to the station, whereas parts which are not local with respect to one station but cooperate with a number of stations in the general control and operation of the device are designated by reference numerals only.

Drum conveying and driving mechanism

Means are provided for advancing the drums from station to station and for chucking and unchucking them at the several stations, all in coordination. However, for the sake of convenience in performing some of the operations, and for safety of the operators, it may be preferred to perform the chucking and unchucking operations independently of the advancing movements and automatically at one or more of the stations. To provide for chucking and driving the drums simultaneously at all of the various stations a long bed plate 10, comprising a series of connected units, supports a plurality of frame members A—11, B—11 . . . M—11, and A—11' . . . M—11', one pair at each station, to which are attached bearing members A—12 . . . M—12 which rotatably support a horizontal shaft 13 which extends lengthwise of the drum conveyor between the reaches thereof. At a convenient position along the shaft 13, between two of the stations, frame members 14, 14' (see Fig. 5) fixed to the base plate 10, support a housing 15 having a bearing 16 for shaft 13. The housing is machined to provide a horizontal guide way in which a rack 17 is slidably mounted crosswise of the shaft 13 in position to operatively engage a pinion 18 fixed to the shaft 13. A double acting hydraulic cylinder 19 is fixed to the housing 15 and a piston 20 fitting therein is connected by a piston rod 21 to rack 17, the arrangement being such that as the piston is moved back and forth by fluid pressure in the cylinder 19 the shaft 13 is given a rocking motion. The ports at the opposite ends of the cylinder 19 are connected by pipes 22, 23 through a reversing valve 24 (see Fig. 1ᵃ) operated by solenoids 25, 26, to a source of fluid under pressure. The valve 24 is operated by the drum conveyor in timed relation thereto, as hereinafter described. To avoid objectionable torsional deflection, a plurality of such shaft-rocking mechanisms may be employed and simultaneously operated, although a single rocking mechanism has been found satisfactory.

To provide for conveying the drums upon which the tires are to be built from station to station, a sprocket shaft 27 (see Figs. 1ᵇ, 2, and 4) is rotatably mounted in bearings 28, 29, 30 at the delivery end of the machine, and has sprockets 31, 32 fixed thereto. An idler shaft 33 is rotatably mounted in bearings 34, 35, at the opposite end of the machine and is provided with sprockets 36, 37. Chains 38, 39 are trained around these sets of sprockets to provide parallel upper and lower reaches extending through the work stations. A plurality of drum carriages 40 are attached to the chains at intervals corresponding to the distance between work stations. Each drum carriage has a pair of parallel axles, each of which rotatably supports a pair of soft rubber drum supporting discs 41, 42 and a pair of track-engaging rollers 43, 44. Angle iron guideways 45, 46 are supported by frame members A—11 ... M—11, so as to guide the rollers 43, 44 of the upper reach of the conveyor, and similar guides 47, 48 are supported by base plate 10 to engage the lower reach of the conveyor. The axles of the drum carriages are arranged crosswise of the line of travel of the conveyor and are so spaced as to support a tire drum with its axis below the axis of the chuck spindles.

To provide for intermittent movement of the drum carriages with acceleration of speed at the start of each carriage movement and deceleration at its finish, so as to permit shifting of the drums in a minimum increment of time and at the same time to avoid shocks in overcoming the inertia of the movable assembly at starting and stopping, a quill or hollow shaft 49, (see Fig. 2) rotatably mounted on shaft 27 has a pinion 50 fixed to one end thereof and a ratchet drum 51 (see Figs. 2 and 4) fixed to the other. A pawl 52 pivoted at 53 to the drum 51 is held by a spring 54 in engagement with a ratchet wheel 55 fixed to shaft 27. A rack 56, slidably mounted in a guideway 57 meshes with pinion 50. A connecting rod 58, connects the rack 56 to a crank 59 fixed to a shaft 60. The length of the crank arm determines the length of the intermittent movements of the chain conveyor. The arrangement is such that due to the use of the crank-operated rack, the movements of the drum carriages are harmonically accelerated and decelerated, thereby avoiding shocks due to sudden starting and stopping of such movements.

In order to drive the chain at a high rate of speed during its intermittent movements and to drive the crank at a slow rate during the idling movements of the pinion 50 a shaft 61, which drives the shaft 60 through a gear reducer 62 of the worm and gear type, has a pulley 63 fixed to one end thereof and a ratchet wheel 64 fixed to the other. A pulley 65 is rotatably mounted on the shaft over the ratchet 64 with which it engages as a roller clutch, rollers 66 being provided to lock the elements when rotated in one direction. A motor 67 drives the pulley 65 constantly at a slow speed through a belt 68. Another motor 69 is adapted to drive pulley 63 at a higher speed through belt 70. A cam 71 fixed to shaft 60 operates by engagement with a switch 72 to start and stop motor 69 through a suitable relay (not shown). The arrangement is such that shaft 60 is continuously revolved by motor 67 until the cam 71 closes the switch 72, thereupon the shaft is rotated at a higher speed as long as switch 72 is closed or during the hauling movement of the conveyor, and the change from the slow speed drive to the high speed drive, and vice versa, takes place when the crank 59 is at dead centers with respect to the direction of travel of the rack 56 and therefore when the chain driving mechanism is under the least load.

Other cams 73, 74, fixed to shaft 60 are adapted to open and close switches 75, 76 respectively, which, through suitable relays, alternately energize solenoids 25 and 26 which control the rocking of the shaft 13 by fluid pressure as heretofore described. The cams are so arranged and timed that just before the hauling movement of the chain is started the solenoid 25 is energized which rocks shaft 13 in a direction to release the drums from the chucks, and following the hauling movement the solenoid 25 is deenergized and solenoid 26 is energized, to rock the shaft in the opposite direction, to chuck the drums.

Each of the frame members, A—11 ... M—11, supports a head stock bracket and each frame member, A—11' ... M—11' similarly supports a tail stock bracket. Each head stock and tail stock is provided with similar driving spindles and cones which are substantially identical in construction and mode of operation. For convenience of description, only those parts at station C will be described, it being understood that similar parts at the other stations will be designated by similar reference numerals with different prefix letters designating the station.

Referring to Figs. 10ᵃ, 10ᵇ, the frame member C—11 supports a head stock bracket C—77 mounted thereon for vertical adjustment and frame member C—11ᵃ similarly supports a tail-stock bracket C—78. Bracket C—77 is bifurcated at its upper end to provide aligned space bearings C—79, C—80. A quill C—81, rotatably journaled in bearing C—79 has a pulley C—82 fixed thereto. A quill C—83 is rotatably and slidably mounted in bearing C—80. A shaft C—84 extends through quills C—81 and C—83 and is rotatably mounted in quill C—83 and slidably mounted in quill C—81, the latter being formed with a keyway to engage a key C—85 on the shaft. The shaft is restrained against sliding with respect to quill C—83 by a ball race C—86 at one end engaging shoulders on the quill and shaft and a thrust collar C—87 at the other end fixed to the shaft.

A split shaft collar C—88 is rotatably seated in a groove turned in the quill C—83 and is pivotally attached to the upper end of a lever C—89. The lower end of the lever is pivotally attached to one end of a connecting rod as at C—90. The center of the lever is machined to provide a box mortice C—91 therethrough in which is slidably fitted a squared block C—92 rotatable about a pin C—93 fixed to bracket C—77.

To provide for endwise movement of shaft C—84 rock shaft 13 has a double ended crank arm C—94 attached thereto. One end of this crank arm is connected by a link to the lower end of arm C—89. To assure clamping of all of the drums, the link is made of two ends C—95, C—96, (see Fig. 55) attached to aligned rods C—97, C—98 by means of screw threads to provide adjustability of length. Rods C—97, C—98 oppositely enter a spring barrel C—99 and engage in compression therebetween a coil spring C—100.

For driving the drum 101, which is in the form of a hollow collapsible cylinder and is adapted to be driven by cones engaging in its margins so that the drums themselves require no spindles, a driving cone C—102 is attached to the end of the spindle C—84 and is formed with a conical male face adapted frictionally to engage a corresponding conical female face of the drum. The conical surface of the drum cone is of such extent axially of the spindle C—84, that when a drum 101 is resting on a drum carriage of the conveyor opposite the spindle C—84 and the spindle C—84 is advanced endwise toward the drum, it being understood that a similar cone spindle is simultaneously advanced toward the drum from the opposite side, the cones of the spindles will enter the ends of the drums and continued movement of the spindles will raise the drum from the conveyor and center it automatically.

For simultaneously operating the opposite cone, C—103, similar mechanism, including a cone spindle C—104, a spindle enclosing quill C—105, a shifter collar C—106, shifter arm C—107, and a link C—108 engaging the opposite end of crank arm C—94, is similarly employed.

For the purpose of driving the spindles during the period when the drums are engaged by the cones, an electric motor C—109 (see Fig. 1ª) is located at the station and its pulley C—110 is connected by a plurality of V-belts C—111 to pulley C—82 (see Fig. 10ª). Similar drum-rotating motors are located at each of the stations. These drum driving motors at stations C, E, I, K, and M are simultaneously started and stopped in timed relation to the movements of the drums by a cam 112, on shaft 60 of the chain hauling unit, (see Figs. 2 and 3) which operates a switch 113, which through a series of electrical relays starts the motors in unison as soon as the drums have been chucked and stops them just before the succeeding drum shifting operation.

The remaining drum driving motors at stations A, B, D, F, G, H, and J, are normally not energized but may be started at will individually by individual foot switches at each station, as hereinafter described.

To provide for adjusting the machine to the building of tires of different diameters, each head stock bracket, such as C—77 is vertically adjustable on one of the pedestals 11 and each tail stock bracket is similarly adjustable on a pedestal 11', by jack screws such as C—114, C—115 being threaded through a member fixed to the pedestal and supporting the head and tail stock brackets respectively.

In the description of the machine units at the various stations, reference is made herein to various fluid pressure operated cylinders whereby the stitching wheels, rollers, bead placing rings and other instrumentalities are motivated. To provide for the operation of these parts at a slow velocity during the tire building operations, and the quick return thereof to their positions of repose, a dual fluid supply unit comprising a high velocity pump 116 and a low velocity pump 117 are driven continuously by a motor 118 (see Fig. 54). Each pump has a fluid pressure line and a return line. The pressure line 119 from the high velocity pump 116 and the pressure line 120 from the low velocity pump are connected through a four way valve 121 to a manifold 122 which supplies the cylinders on the station units through their respective control valves. An arm 123 fixed to shaft 13, is connected by a connecting rod 124 to the reversing lever 125 of the valve 121. The arrangement is such that when shaft 13 is rotated in a direction to cause the drums to be chucked at the stations, the valve 121 is adjusted thereby to deliver fluid at a low velocity to the tool operating cylinders, and when the shaft 13 is rotated in the opposite direction to release the drums, the valve is adjusted to deliver fluid at high velocity to the tool operating cylinders to cause a quick return of the tools.

The exhaust fluid return lines from the tool operating cylinders empty through a manifold 126 into a fluid supply tank 127 from which the suction lines of both high and low velocity pumps receive their supply. Preferably a substantially noncompressible fluid such as oil is used as a pressure fluid. As both pumps are running at all times, when the delivery line of one pump is connected through valve 121 to the pressure manifold 122, the delivery line of the other is connected through the valve 121 to the return line to relieve pressure on the pump not needed for supplying pressure fluid.

Fabric applying units

The fabric applying units at stations A, B, F, and G perform similar operations and are substantially identical. A description of the mechanism at station A will be given as an example of the construction at each of these stations.

In addition to the drum chucking and driving mechanism carried by the head and tail stock brackets A—77 and A—78, which have been previously described, cone A—102 has attached thereto a fabric guiding sleeve A—200 of the same outside diameter as the greatest diameter of the drum and constituting a continuation of the drum face, see Fig. 6. A guide line A—201 is engraved therein to aid the operator in aligning the fabric. Cone A—103 is similarly provided with a guiding sleeve A—202 provided with a guide line A—203. A guide frame A—204, see Figs. 6 and 8, is mounted on brackets A—77, A—78, and a plurality of anti-friction rolls A—205, comprising the floor of the frame, are mounted thereon. A pair of guide fences A—206, A—207, are slidably mounted on the frame and may be adjusted toward and from each other by a right and left hand threaded feed screw A—208. Bias cord fabric may be supplied from any convenient source and is drawn between the guide fences onto the drum during a single rotation of the drum and then spliced to form a band by the operator. To conserve space it is convenient to supply the fabric from a supply source located laterally of the drum conveyor. The following mechanism has been found convenient for this purpose:

A supporting frame A—209 is fastened to the floor adjacent the drum conveyor and has a cantilever part A—210 over-hanging the conveyor. A guiding roll A—211 is rotatably mounted therein parallel to the drum axis, and other guide rolls A—212, A—213, A—214, are rotatably mounted thereon at right angles to the drum axis. To guide the fabric from roll A—212 to roll A—211 two fixed guide bars A—215, A—216 are mounted on the frame diagonally with respect to the rolls. Each guide bar is provided with a plurality of anti-friction guides, each comprising a forked shank A—217, (see Fig. 9) rotatably adjustable in a hole A—218 provided through the bar at an angle to its face, and a free running roller A—219 mounted in its forked end, the rollers being arranged parallel to each other, and all of the rollers on each bar being so set obliquely as to guide the sheet material to the new direction laterally of the sheet without substantial slippage of the material upon the rollers and without imparting substantial frictional stress to the sheet material transversely thereof. For this purpose the rollers are arranged with their axes parallel to each other and in the proper disposition so that points on their peripheries first contacting the oncoming sheet (in alignment with a line oblique of the sheet) travel in the direction of the oncoming sheet, and points on their peripheries last contacting the sheet travel in a direction corresponding to the direction of departure of the sheet.

In the illustrated embodiment the fabric is turned through a right angle laterally of its original direction of feed, the right angle turn being effected by two successive turns of 45° each. The rollers at each turn are mounted in alignment at 45° to the direction of feed of the oncoming fabric. At the first turn each roller is mounted so that as viewed from above in Figs. 7 and 9, its axis of rotation is disposed transverse to the original direction of feed of the fabric and, as viewed from the front in the original line of feed, as in Fig. 8, the axis is oblique to the horizontal to a degree sufficient for the roller to conduct the fabric to the new direction of feed without substantial tendency of the fabric to slip laterally on the contacted roller surface. The rollers at the second turn are correspondingly mounted so that the tendency for lateral slippage of the fabric is avoided.

Set screws A—220 are provided to lock the roll shanks in the desired positions. Roll A—211 is driven by a chain A—221 through a variable speed device A—222, of the Reeves type, which is driven by a chain A—223, from a sprocket A—224, fixed to pulley A—82. The arrangement is such that when the drum is rotated, the fabric is fed thereto by roll A—221 without tension, or at any desired tension, as desired. Where drums of a different size are employed, the variable speed device A—222 may be adjusted to deliver the fabric accordingly. The fabric is drawn from a free loop A—225 which is supplied from any desired source such as a splicing table (not shown).

The electric motor which drives the spindle of this unit is normally idle and may be started at will by the operator at this station by means of a convenient foot-operated switch located on the floor at the operator's station. The operator pulls a ply of fabric forward to contact with the drum, and then starts the motor by depressing the switch through one revolution of the drum, after which the operator tears or cuts off the required length, and fits its ends together about the drum.

*Under-bead ply turn down unit*

After the under bead plies of cord fabric have been applied to the drum, at stations A and B, the drum is transferred to station C where the margins of the plies are formed down over the shoulders of the drum. The apparatus employed at station C is shown in Figs. 10ᵃ to 15 and includes, in addition to the means for chucking and driving the drum, previously described, the following mechanism:

Fixed to head stock bracket C—77 and tailstock bracket C—78 are a pair of pedestals C—250 and C—250′ in which a horizontal shaft C—251 is rotatably journaled parallel to the drum axis. A pair of lever arms C—252, C—252′ are keyed to shaft C—251, and are pivotally connected to the piston rods C—253, C—253′, of double acting cylinders C—254, C—254′, which are pivotally mounted on the head and tail stock brackets. Fixed to shaft C—251 are a pair of arms C—255, C—255′, each of which carries at its outer end a grooved pulley C—256, C—256′. A similar pulley C—257, C—257′ is rotatably mounted on shaft C—251 in line with each, and round belts C—258, C—258′ of extensible rubber are supported thereby in such position as to engage the margins of the fabric over the shoulders of the drum. Arms C—259, C—259′ fixed to shaft C—251, rotatably support a shaft C—260 parallel thereto. A pair of arms C—261, C—261′, are pivoted upon shaft C—260 and carry pivots C—262, C—262′, at their outer ends respectively. Pivots C—262, C—262′ each carry an arm C—263, C—263′ fixed thereto. Each arm has its upper end attached to its arm C—261 or C—261′ by a tension coil spring, C—264 or C—264′, and at its lower end supports a rotatable pulley, C—265 or C—265′. Fixed to each pulley C—257 or C—257′, is a pulley C—266 or C—266′, in line with pulleys C—265, C—265′ and a gear C—267 or C—267′. A flat belt C—268 is trained about pulleys C—265 and C—266, and a similar belt, C—268′, about pulleys C—265′ and C—266′, so as to align with the drum just inside the reduced shoulders thereof. Gears C—269, C—269′, fixed to shaft C—260 mesh with gears C—267 and C—267′ respectively. As shaft C—251 is rocked by the cylinders C—254, C—254′ toward the drum, the flat belts C—268, C—268′ contact with the fabric on the flat face of the drum and prevent its wrinkling by clamping action, while the round belts C—258, C—258′ form the margins of the fabric down over the shoulders of the drum. When the rocking movement is reversed both sets of belts are raised from contact with the drum. A sprocket C—270 fixed to shaft C—260 is driven by a chain C—271 from a sprocket C—224 fixed to pulley C—82 to propel the belts at the desired velocity to that of the drum.

The pressure of belts C—268, C—268′ against the drum is gravitational but their downward movements are limited, by rods C—272, C—272′ linked to arms C—261, C—261′ and slidable through a stationary bracket C—273 fixed to the frame members, and adjustable stops C—274, C—274′ on said rods. When arms C—255, C—255′ are raised, the arms C—261, C—261′ engage with shaft C—251 and are also raised, as they are fulcrumed thereabout. Guide rollers C—275, C—275′ on arms C—255, C—255′, engage the belts C—258, C—258′ and hold them laterally against the fabric on the drum.

To provide for rocking the belts into and out of engagement with the drum, in timed relation to the chucking and unchucking of the drums, a reversing valve C—276 of the slide valve type is mounted on the tail-stock frame member C—78 and is adapted to be actuated by a pivotal arm C—277 one end of which engages a groove in spindle C—104, (see Figs. 10ᵇ and 15). Fluid pressure is supplied from a convenient source, such as from manifold 122, through a pipe C—278 to the valve. When spindle C—104 is advanced to chuck a drum, the valve C—276 is operated to cause fluid to be delivered to the rear ports of cylinders C—254, C—254′, to force the belts toward the drum, and open the front ports to the exhaust. Withdrawal of the spindle reverses the flow to raise the belts from the drum. The exhaust pipe C—279 of valve C—276 is connected to manifold 126 previously described.

*Bead setting unit*

The bead setting unit, comprising station D, includes, in addition to the drum chucking and driving mechanism carried by the head-stock and tail-stock brackets D—77 and D—78, which have been previously described, other special mechanism, best shown in Figs. 20ᵃ and 20ᵇ, as follows:

To provide for placing the beads, which are of ring form, on the margins of previously applied cord fabric, the spindles D—84, D—104, are made hollow, and single acting hydraulic cylinders D—300, D—300' are fixed to the outer ends thereof respectively. Pistons D—301, D—301' therein are attached to rods D—302, D—302', which extend therethrough and have spiders D—303, D—303', the arms of which extend rearwardly through clearance openings in the driving cones, attached thereto. A pair of cylindrical bead setting rings D—304, D—304' are rotatably mounted on the spiders and are supported thereon by small rollers, carried by the spiders, which rollers engage grooves turned in the inner faces of the rings. Compression coil springs D—305, D—305' encompass the rods D—302, D—302', between the pistons D—301, D—301' and shoulders formed in the bore of the spindles, and normally hold the bead placing rings away from the drum.

For projecting the bead placing rings into contact with the drum during rotation of the drum, fluid pressure is supplied to cylinders D—300, D—300', through swivel pipe connections D—306, D—306' which are prevented from rotating with the spindles by support rods D—307, D—307', the lower ends of which are retained by slotted guides D—308, D—308', (see Fig. 20ᵇ) so as to permit their movement toward and from each other with endwise movement of the spindles but to restrain them against rotary movement of the spindles.

To force the beads from the bed-placing rings, where they have been mounted by the operator during drum conveying movements, into adhesive engagement with the fabric on the drum, double acting fluid pressure cylinders D—309, D—309' (see Figs. 16 to 19) are slidably mounted in guide way brackets D—310, D—310', fixed to head and tail stock brackets D—77 and D—78 respectively, so as to slide parallel to the axis of the drums. Pistons D—311, D—311', therein are attached to piston rods D—312, D—312', which are fixed to the guide way brackets.

Bead-stitching wheels D—313, D—313' are rotatably mounted on shanks D—314, D—314' resiliently supported from the cylinders on compression coil springs D—315, D—315', the cylinders being formed with spring-barrel pockets to support them. The bead stitcher rolls are preferably of conical shape and are so located as to just clear the surface of the bead rings. As the rolls are advanced toward each other, they progressively force the bead cores laterally from the bead placing ring into adhesive engagement with the fabric on the drum.

To provide for rolling the skirts of the flipper strips into engagement with the fabric plies, a pair of brackets D—316, D—316', (see Fig. 21) attached respectively to head stock bracket D—77 and tail stock bracket D—78, rotatably support a shaft D—317 parallel to the axis of the drum. A pair of collars D—318, D—318' are slidably mounted on shaft D—317 and are prevented from turning thereabout by keyways in the collars engaging a feather key on the shaft. Collars D—319, D—319' fixed on the shaft, rotatably support a pair of sprockets D—320, D—320', and a chain D—321 is trained about the two sprockets. Collar D—318 is attached to one reach of the chain, and collar D—318', to the opposite reach, whereby movement of one collar along the shaft in one direction causes an equal movement of the other collar along the shaft in an opposite direction.

To privide means for causing such movement, a double acting fluid cylinder D—322 is slidably mounted on shaft D—317 and is connected by a rod D—323 to collar D—318. The piston thereof D—324 is connected to collar D—318' by a piston rod D—325. When fluid is admitted to the rear end of the cylinder, through port D—326, collars D—318, D—318' are forced apart. When fluid is admitted to the front end of the cylinder through port D—327, the collars are moved toward each other.

A pair of arms D—328, D—328', are pivoted respectively on collars D—318 and D—318' and are urged toward the drum by compression coil springs D—329, D—329' and studs D—330, D—330' which are fixed to the respective collars and pass through clearance openings in the arms and through the springs. A pair of disc rollers D—331, D—331', preferably formed of soft vulcanized rubber and having rounded faces are rotatably mounted on the ends of arms D—328 and D—328' respectively in such position as to be in alignment with the edges of the tire on the drum when the arms are moved apart and to traverse the flipper strips during movement toward each other.

For moving the disc rollers D—331, D—331' radially toward and away from the drum, a double-acting cylinder D—332 is pivotally attached to head stock D—77, its piston, D—333, is attached pivotally by piston rod D—334, to a lever arm D—335, fixed to shaft D—317. When fluid pressure is applied through the rear port D—336, of the cylinder D—332, disc rollers D—331, D—331' are moved radially toward the drum, which they engage, compressing springs D—329, D—329'. When fluid pressure is applied through the front port D—337, the discs are raised away from the drum.

To provide means for preventing adhesion of the skirts of the bead flippers in advance of the progressive rolling thereof whereby their margins might be buckled or turned under, a rod D—367 fixed to brackets D—316, D—316', parallel to the axes of the spindles has a pair of collars D—368, D—368' fixed thereto. Vertically disposed pivots D—369, D—369', rotatable respectively in bearings formed in said collars, have arms D—370, D—370' fixed thereto and extending over the face of the drum. Rearwardly extending arms D—371, D—371', fixed to said pivots, have their ends attached to extension coil springs D—372, D—372', the other ends of the springs being attached to the rod D—367. Fixed to arms D—370, D—370' respectively are a pair of blocks D—373, D—373', to each of which is adjustably fixed a plough blade D—374, D—374', such ploughs being so adjusted that they normally extend along the face of the drum outwardly extending with their points underlying the flipper strips. Suitable stops are provided to limit their motion when the points are at the shoulders of the beads. A pair of stops D—375, D—375', fixed to arms D—370, D—370' respectively are adapted to stand in the path of arms D—328, D—328'. The arrangement is such that as rollers D—331, D—331' are advanced over the bead flippers, the arms D—328, D—328' supporting such rollers contact with the stops D—375, D—375' and progressively withdraw the ploughs D—374, D—374' in advance of the progress of the rollers over the flipper strips, thereby assuring separation of the flipper strips from the material on the drum until the strips have been properly rolled into contact therewith.

The chucking and driving of the drum at this station is independent of the chucking and driving of the drums at the other stations. For this purpose a quill shaft D—338 (see Fig. 25) is rotatably mounted on shaft 13 between collars fixed thereto, (see Figs. 20ª and 25) and within a housing D—339 supported by base plate 10. A pinion D—340 is keyed to the quill shaft and meshes with a rack bar D—341 slidably mounted in the housing. A double acting fluid pressure cylinder D—342 is fixed to the housing and has a piston D—343 connected to the rack bar. Quill D—338 may be rocked with respect to shaft 13 by fluid pressure applied to either end of the cylinder. A double ended rocker arm D—344 has its ends pivotally connected to rods D—345, D—345' which, acting through rocking levers D—346, D—346' advance and withdraw the spindles D—84, D—104 in the manner described heretofore in the description of station C.

To control the movements of the various instrumentalities in timed relation to each other a cam shaft D—347 (see Figs. 20ª and 26) is rotatably mounted on a housing D—348, to which is fixed an electric motor D—349. The motor drives the cam shaft through a chain drive D—350. Mounted on the housing are a plurality of double acting fluid control valves D—351, D—352, D—353, and D—354 and a pair of normally open limit switches D—355, D—356, each of which is adapted to be controlled by a cam on the cam shaft. A starting switch D—357, of the foot actuated type is fixed to the floor near the unit. By momentarily depressing the foot switch D—357, the motor D—349 is started, thereby turning the cam shaft. Cam D—358 immediately closes switch D—355 which controls revolution of motor D—349. Cam D—359 next depresses valve D—351 to cause the cones to advance and chuck the drum. Next switch D—356 is closed by cam D—360 to start motor D—361 which rotates the spindles. Cam D—362 then depresses valve D—352 causing the bead placing rings to be advanced toward the drum. Cam D—363 then depresses valve D—353 to advance the bead placing rollers toward each other. Then cams D—362 and D—363 next release valves D—352 and D—353 which reverse under spring pressure to cause the return of the bead placing rings and the bead placing rollers. Cam D—364 then depresses valve D—354 which rocks stitching discs D—331—D—331' radially toward the drum. The rocking of shaft D—317 operates by means of an arm D—366, a double acting fluid pressure valve D—365 mounted on tail-stock bracket D—78, (see Figs. 16, 20ᵇ and 26) causing the rollers D—331, D—331' to move laterally across the drum through the agency of cylinder D—322 supplied through valve D—365. Cam D—364 then releases valve D—354 which reverses under spring pressure and raises rollers D—331, D—331' at the same time operating valve D—365 to return the rollers laterally of the drum to their original positions. Cam D—360 then opens switch D—356 stopping motor D—361. Then cam D—359 releases valve D—351, which reverses under spring pressure and releases the drum, by withdrawing the cones. Finally cam D—358 releases switch D—355, stopping motor D—349.

The valves D—351, D—352, D—353, and D—354 are supplied by pressure fluid from the manifold 122 and discharge into manifold 126.

Under-bead fly turn-up unit

The under bead plies of cord fabric have their margins turned up over the beads at station E. The mechanism comprising the machine unit at that station is as follows:

In addition to the mechanism for chucking and driving the drum, previously described, a pair of brackets E—400, E—400', (see Figs. 27ª and 27ᵇ) fixed to head-stock bracket E—77 and tail-stock bracket E—78 respectively, jointly support a pair of spaced cam plates E—401, E—401' which extend from the head stock to the tail-stock above the drum. A pair of duplicate cam slots E—402, E—402' and E—403' of devices form are provided in the cam plates above each marging of the drum to guide a pair of tumbler shafts E—404, E—404' (see Fig. 29) each of which rotatably supports, between the cam plates, the shank of a stitcher wheel, E—405, E—405'.

To provide for movement of the stitcher wheels laterally across the drum, each tumbler shaft is rotatably mounted between the arms of a forked yoke E—406, E—406' fixed to a piston rod E—407, E—407' which is in turn fixed to a piston E—408, E—408', fitted in a double acting fluid pressure cylinder E—409, E—409'. These cylinders are pivotally mounted on brackets E—410, E—410' fixed respectively to head stock E—77 and tail stock E—78, the brackets permitting vertical swinging motion of the cylinders.

In their positions of rest, stitcher wheels E—405, E—405', are held with their stems in a substantially horizontal position, as shown in Fig. 31, by extension coil springs E—411, E—411', (see Fig. 30) each of which is attached at one end of an arm E—412 or E—412' fixed to a yoke E—406 or E—406', and the other end of which is attached to a chain, E—413 or E—413' wrapped partially about the tumbler shaft E—404 or E—404' and attached thereto, the arrangement being such that turning of the tumbler shaft is resisted by the spring and by arms E—414 and E—414', fixed to the tumbler shafts respectively and resting against pins E—415 or E—415' fixed to the cam plates. In this position the stitcher wheels are clear of the cones and the drum to permit chucking movements.

As the tumbler shafts are advanced toward each other and the arms E—414, E—414' leave the stop pins E—415, E—415', the tumbler shafts are caused to rotate in a direction to bring the stitcher wheels into contact with the shoulders of the drums as shown in Figs. 27ª and 27ᵇ. Upon further movement of the tumbler shafts, the stitcher wheels engage under the margins of the under-bead plies and execute the movement indicated in Fig. 30, the stems of the stitcher wheels being forced back to a substantially horizontal position by contact with the beads as the margins of the plies are rolled up over the beads.

Near the end of their advance movement, during which springs E—411, E—411' are extended, latch members E—416, E—416', pivoted on the yokes E—406, E—406' engage catches E—417, E—417' on the tumbler shafts, as illustrated in Fig. 32, and hold the stitcher wheels with their stems horizontal. Stop pins E—418, E—418', fixed to the cam plates, insure locking of the tumbler shafts by engaging arms E—419, E—419' fixed to the tumbler shafts.

During the return movement of the tumbler shafts along the cam slots, the shafts remain latched until arms E—414, E—414' have engaged stop pins E—415, E—415' whereupon latches E—416, E—416' engage a pair of spring plunger stops E—420, E—420', fixed to the cam plates as illustrated in Fig. 31, and release the tumbler shafts.

In order to eliminate undue friction between the stitcher wheels and the fabric, fountain swabs E—421, E—421' are fixed to the tumbler shafts so as to bear against the stitcher wheels, and are fed with a liquid lubricant from a tank E—422 through flexible tubing.

To insure operation of the latches E—416, E—416', they are pivoted on rods E—423, E—423' (see Figs. 28 and 29) fixed to the yokes E—406, E—406', and coil springs E—424, E—424', encompassing the rods, have one end fixed to collars E—425, E—425' pinned to the rods, and the other end fixed to the latch.

To prevent wrinkling of the fabric as it is reversed around the bead, and to hold the bead in place against the shoulder of the drum as the fabric is formed thereabout, auxiliary holding and forming rollers may be employed if desired. These are constructed as follows:

A pair of single acting fluid pressure cylinders E—426, E—426' (see Fig. 33), are fixed to the cam plate E—401' and also to the head stock E—77 and tail stock E—78 respectively, and have pistons, controlling piston rods E—427, E—427', on which a pair of rollers E—428, E—428' are respectively rotatably mounted. The cylinders are mounted so that their pistons travel laterally of the drum with the rolls aligned with the beads. Tension coil springs E—429, E—429', each having one end fixed to a cylinder and the other end to the corresponding piston rod, are adapted to return the pistons and thereby withdraw the rollers from contact with the beads. Fluid under pressure is admitted to the rear end of the cylinders through a two way valve E—430, fixed to cylinder E—409. This valve is normally held in a position to connect the cylinder to the return manifold 126 by a coil spring (not shown) and is adapted to be shifted to admit fluid under pressure from manifold 122 to the cylinders by depressing a plunger E—431 against the spring pressure. A cam E—432 is slidably mounted on cylinder E—409 and is fixed to piston rod E—407. As piston rod E—407 is advanced, the cam engages a roller E—433 on valve plunger E—431, advancing the rollers against the beads. The cam E—432 is so timed with relation to the operation of stitcher wheels E—405, E—405' as to advance rolls E—428, E—428' after stitcher wheels E—405, E—405' have turned the margins of the fabric to a radial position with respect to the drum, and to continue holding the beads until the wheels E—405, E—405', have turned the corner and have started across the flat face of the drum, whereupon the rollers E—428, E—428' are automatically retracted by the coil springs.

The operation of the stitching mechanism is controlled in timed relation with the chucking of the drum by a double acting fluid pressure valve E—434 (see Figs. 27ª and 33), to which cylinders E—409, E—409' are connected by flexible tubing. This valve is fixed to head stock bracket E—77 and is operated by a lever E—435 which engages at one end the valve plunger and at the other end extends between stop collar E—436 and a shoulder on spindle E—84. Movement of the spindle in a direction toward the drum, during a chucking movement, causes the lever E—435 to depress the plunger, admitting fluid under pressure to the rear of cylinders E—409, E—409' from manifold 122 as shown in Fig. 33, and venting the front ends of such cylinders to the exhaust manifold 126. When the spindle is retracted to release the drum, the valve plunger is shifted by a spring E—437, to reverse the fluid supply and return the stitcher wheels to their positions of rest.

Breaker strip and chafing strip unit

The breaker strip and chafing strip applying unit at station H (see Figs. 34 and 35) comprises the chucking and driving mechanism previously described, and in addition thereto, a series of guides for delivering the strips to the drums from a continuous supply thereof. For convenience the strip supply may be located laterally of the drum conveyor and the fabric manipulating stations. A platform H—450 is supported above the drum by frame members H—451, H—451'. Flanged pulleys H—452, H—453, H—454 are rotatably mounted on suitable brackets upon the platform and support bites of delivery belts such as H—455 upon which the strip material is delivered to a position above the drum. A swinging counterbalanced guide trough H—456 is pivoted about an axis H—457 parallel to that of the drum where it may be swung toward the drum by the operator at the station, and is formed with grooves for guiding the respective strips. Between the trough and the pulleys H—452, H—453 and H—454, the strips are guided over suitable free running guide rolls H—458, H—459, and H—460, a guide roll H—461 rotatably mounted on the swing frame providing further guiding means.

The drive motor H—462 (see Fig. 1ª) at this station is independently started and stopped by a foot switch H—463 handy to the operator, who spots the ends of the strips, rotates the drum through one revolution, cuts the strips to length and joins the ends on the drum.

Carcass and tread stitching units

The carcass and tread stitching units at stations I and K are substantially identical. One being used to roll the fabric material across the straight face of the drum and the other to roll the tread across the straight face of the drum. The unit at station I will be described as follows:

In addition to the drum chucking and driving mechanism previously described, a pair of pedestals I—500, I—500' are mounted upon the headstock bracket I—77 and tail stock bracket I—78 respectively, and rotatably support, in spaced relation, a pair of shafts I—501, I—501', parallel to the drum axis (see Figs. 36ª to 41). An additional spacing bracket I—502, directly over the center of the drum face, is supported from pedestals I—500, I—500', by a pair of truss members I—503, I—503' connected thereto.

Mechanism is provided for simultaneously rocking shafts I—501, I—501' on their axes in opposite directions. For this purpose a gear I—504 is fixed to shaft I—501. A similar gear I—505 is fixed to shaft I—501'. A pair of idler gears I—506, I—507 are rotatably mounted on studs I—508, I—509, fixed to pedestal I—500', so as to mesh with each other and provide a continuous gear train with gears I—504 and I—505. A lever arm I—510 is fixed to shaft I—501 and its extending end is pivoted to a piston rod I—511 to which a piston I—512 within a double acting fluid cylinder I—513, is fixed. Cylinder I—513 is pivotally mounted at I—514 to a yoke I—515, fixed to pedestal I—500. The arrangement is such that as fluid under pressure is admitted to the lower end of cylinder I—513, shafts I—501, I—501' are rocked on their axes in different directions. The rocking mechanism is duplicated at the other ends of the shafts by the provision of a cylinder I—513' and similar levers and gears.

Shaft I—501 is formed with splines I—516, I—517, to each of which a sliding quill I—518 or I—519, is keyed. These quills have shoulders at one end and are threaded at the other end to receive threaded collars. Shaft I—501' is similarly formed with splines I—520, I—521 to engage similar quills I—522, I—523. Each of the four quills nonrotatably supports thereon a collar I—524 having three projecting arms I—525, I—526, I—527 (see Fig. 37). Arm I—527 has pivotally attached thereto a pair of bell crank levers I—528, I—529 each of which has journaled on the end of one of its arms, a stitcher wheel I—530 or I—531. A push rod I—532 is pivoted at one end to arm I—525. Its other end slides through a swivel guide on bell crank I—527. A compression coil spring I—533 encloses the rod between the two arms and acts to yieldingly press the stitcher wheel against the drum. Wheel I—531 is similarly held by a plunger I—534 and spring I—535. Stitcher wheels I—536 and I—537 are similarly supported on shafts I—501'. The wheels are arranged so that their paths of contact with the drum are offset from each other by the thickness of the wheel face.

To provide for progressive movement of the stitcher wheels from the center of the drum toward its margins, a pair of double acting fluid pressure cylinders I—550, I—550' are fixed to the head stock and tail stock brackets respectively. Their pistons, I—551, I—551' are attached to piston rods I—552, I—552' disposed parallel to the drum axis. A cross head I—553 or I—553', slidably engaged between stops on the end of the rod, has its ends apertured to rotatably receive one of the quills on each shaft I—501, I—501', the arrangement being such as to progressively move the quills along the shafts but to provide lost motion at the end of the stroke to permit several revolutions of the drum before the stitchers start to move apart.

To provide for movement of the stitcher wheels laterally in timed relation to the rocking movement of shafts I—501, I—501', a four-way valve I—554 is mounted on pedestal I—500' with its plunger engaging an arm I—555 (see Fig. 38) fixed to shaft I—501', the arrangement being such that shaft I—501' is rocked in a clockwise direction, in Fig. 38, the plunger of the valve I—554 is depressed against its plunger spring so as to supply fluid under pressure to the forward end of cylinders I—550, I—550' and to connect their rear ends to the exhaust line. Rocking of the shaft in the opposite direction permits the spring to reverse the valve so as to deliver fluid under pressure to the rear ends of the cylinders and to return the stitcher wheels to their idle position midway of the drum. To provide for rocking the shafts I—501, I—501', in timed relation to the drum chucking movements, a similar valve I—556 on tail stock I—78 has its plunger in position to be engaged by a lever I—557, pivoted on the frame and engaging a collar on spindle I—104. The arrangement is such that movement of the spindle toward the drum, in a chucking movement, depresses the valve plunger against its spring and delivers fluid under pressure to the upper ends of cylinders I—513, I—513' so as to rock the stitcher wheels toward the drum, and movement of the spindle in the opposite direction permits the valve spring to reverse the valve so as to deliver fluid pressure to the lower ends of cylinders I—513, I—513' to raise the stitcher wheels from the drum. Valves I—554 and I—556 are supplied by fluid under pressure from the manifold 122 and discharge into manifold 126.

*Tread slab applying unit*

The tread slab applying unit, at station J includes in addition to the drum chucking and driving mechanism, previously described, mechanism for feeding a tread slab to the drum and for applying it thereto as follows:

A pair of brackets J—600, J—600' (see Figs. 42 and 44) are fixed to head-stock and tail-stock members J—77 and J—78 respectively, and rotatably support a shaft J—601 parallel to the drum axis. Shaft J—601 has a feed roller J—602 attached thereto. A drive sprocket J—603, fixed to pulley J—82 is adapted to drive shaft J—601 through a chain J—604 and a sprocket J—605 fixed to said shaft.

Brackets J—600, J—600' also rotatably support a shaft J—606, parallel to shaft J—601. On this shaft, a pair of arms J—607, J—607' are mounted, and between the ends of these arms an idle roller J—608 is rotatably mounted above roll J—602. A rod J—609, also parallel to shaft J—601, and fixed to brackets J—600, J—600', supports the lower end of a chute J—610 over which the tread slab is delivered to the feed roll. The chute J—610 is provided with a floor of free running rollers J—611 to relieve friction. As the tread slab, which has been cut to proper length with the beveled ends, is delivered down the chute, it is engaged by the feed roller J—602 and the idle roller J—608 and is fed onto the drum as the drum is rotated.

To provide for pressing the slab to the fabric layers on the drum, a shaft J—612 is rotatably journaled in bracket J—600, J—600', parallel to the drum axis. A pair of arms J—613, J—613', fixed thereto, extend in the same direction and support at their extremities a shaft J—614, parallel to shaft J—612. A plurality of rollers J—615, J—616, J—617, J—618, J—619, are freely mounted thereon independent of each other and having their combined faces formed to complement the contour of the tread slab. An arm J—620, fixed to shaft J—612 is pivotally connected to a piston rod J—621 to which is fixed the piston J—622 fitted in a double acting fluid pressure cylinder J—623. A hand operated reversing four-way valve J—624 fixed to the frame of the machine near the operator is connected between the source of fluid pressure and the cylinder J—623. By manipulating the valve in one direction the pressing rollers are forced against the leading end of the slab, pressing it against the drum. The drum is then rotated through one revolution to apply the tread. By moving the valve lever in the opposite direction, the rolls are raised from the drum. The drive motor J—625 at this station is controlled by the operator by means of a foot switch J—626 located at the station (see Fig. 1b).

To prevent rotation of the drum in the reverse direction, and to permit the operator to stretch the trailing end of the tread when the tread is slightly short to cause the ends to meet without rotation of the drum, the sprocket J—603 and pulley J—82 are fixed to a ratchet wheel J—627, and a pawl J—628 engaging the ratchet is pivoted to the head stock bracket, the arrangement is such as to prevent backward turning of the drum. Valve J—624 receives fluid under pressure from manifold 122 and discharges into manifold 126.

*Tread splice rolling unit*

The tread splice-rolling unit, at station L, includes in addition to the automatic chucking mechanism, previously described, manually operated means for rotating the drum to locate the tread splice in the desired operating position, and means for rolling the tread splice laterally of the drum.

To provide mechanism whereby the operator may rotate the drum at will, the quill L—81 through which the head stock spindle L—84 is slidably mounted is provided with a worm wheel L—650 in place of the usual pulley. A shaft L—651 is rotatably mounted in a bracket L—652 fixed to the head stock L—77 and has a worm L—653 and a hand wheel L—654 fixed thereto. Worm L—653 meshes with worm wheel L—650, and as quill L—81 is keyed to the spindle L—84, the spindle may be rotated at will, no other driving means being provided for the spindle at this station.

To provide for rolling the splice, a pair of pedestals L—655, L—655' adjustable in height to permit adjustment for different sizes of tires, and fixed to the head-stock L—77 and tail stock L—78 respectively, support a pair of yokes L—656, L—656' whereby a pair of rails L—657, L—657' (see Fig. 45) are supported in spaced relation parallel to the drum axis. A carriage L—658 is mounted to travel thereon and is held in place by rollers L—659, L—659' of which there are a plurality of sets embracing the rails.

A double acting fluid pressure cylinder L—660 is attached to the rails and its piston L—661 is connected by a rod L—662 to the carriage L—658. A hand operated four-way valve L—663 is fixed to the head stock and connects the cylinder to a source of fluid under pressure such as manifold 122, exhausting to manifold 126. The arrangement is such that by operating the valve L—663, the carriage L—658 may be propelled back and forth along the rails.

The carriage L—658 is formed with a vertically disposed barrel L—664 in which a plunger L—665 is slidably mounted. A coil spring L—666, of the compression type, is mounted under compression between the head of the plunger and the top of the barrel. Movement of the plunger vertically is restricted by a stem L—667 attached to the plunger and extending through an aperture in the top of the barrel and having a nut L—668 threaded to the stem so as to provide initial adjustment. A key-way in the plunger engages a key in the wall of the barrel to prevent rotative movement.

Rotatably mounted on the lower end of the plunger is a conical roller L—669 having its axis acute to the vertical plane so as to bring its conical face substantially tangential to the drum face. The working face of the roller is knurled. The arrangement is such that as the roller is driven back and forth axially of the drum over the seam in the tread slab, (see Fig. 45) the differential velocities of different circumferential zones of the face of the roller causes a distortive movement of the rubber under pressure which assists in smearing the slab ends into each other.

*Chafing strip and ply turn-under unit*

The chafing strip and ply turn-under unit employed to stitch the margins of the chafing strip and cord fabric plies around and under the bead at station M comprises in addition to the drum chucking and driving mechanism, previously described, the following mechanism:

A pair of pedestals M—700, M—700', adjustable in height to provide adjustment for different sizes of tires, (see Figs. 46ª to 48) are fixed to head-stock M—77 and tail-stock M—78 respectively and support a pair of cam plates M—701, M—701', parallel to each other and to the axis of the drum. A pair of double acting fluid pressure cylinders M—702, M—702' are fixed to the cam plates at opposite ends thereof and facing each other. Pistons M—703, M—703' located in the cylinders are fixed to the ends of piston rods M—704, M—704'. The other ends of the rods are fixed to cross heads M—705, M—705' which are guided in straight portions of cam slots M—706, M—706' formed in the cam plates. A pair of rocker shafts M—707, M—707' are guided in the same slots at a distance therebeyond, and are connected to the cross heads by connecting rods M—708, M—708' so as to travel devious portions of the slots. Stitcher wheels M—709, M—709' are rotatably mounted on the rocker shafts at right angles to the axes of the shafts.

To provide for controlling the rocking movements of the rocker shafts, which are free to rotate in the cam slots, a pair of double acting fluid pressure cylinders M—710, M—710', are supported by links M—711, M—711', from piston rods M—704, M—704', each cylinder being formed with trunnions to pivotally engage the upper ends of the links which in turn are pivotally connected to the piston rods. These cylinders have pistons M—712, M—712' fitted therein and fixed to piston rods M—713, M—713'. Each piston has an arm M—714, M—714' pivotally connected to its outer end, which arms are fixed to rocker shafts M—707, M—707' respectively. When pistons M—712, M—712' are moved with relation to their cylinders, the rocker shafts are rocked on their axes, turning the stitcher wheels thereabout. The shape of the cam grooves M—706, M—706' also effects the turning movement of the rocker shafts as well as their elevation above the drum.

At the start of the stitching movement, it is desirable to prevent too rapid projection of the stitcher wheels against the tire. A convenient means of controlling this movement may be provided as follows:

A pair of pins M—715, M—715', are fixed to the cam plates, and a cam arm M—716, M—716' is fixed to each rock shaft in such a manner as to project radially therefrom and to engage under a pin as the rock shafts near the innermost ends of the cam slots, the arrangement being such that movement of pistons M—712, M—712' toward the rear of cylinders M—710, M—710' while the arms M—716, M—716' are engaged under the fulcrum pins M—715, M—715' will retard the rotation of the rock shafts until the stitching wheels rest upon the tire.

To prevent scuffing of the rubber coating from the chafing strips, swabs M—717, M—717' are fixed to the rocker shafts so as constantly to engage the surfaces of the stitcher wheels M—709, M—709' to lubricate the same, and a tank of lubricant M—718 mounted above the cam plates is connected to the swabs by flexible tubing so as to feed lubricant thereto.

To provide for control of the movement of the stitching wheels in timed relation to the chucking of the drum, a four-way valve M—719 is fixed to the tail stock bracket M—78 and adapted to be moved through a lever M—721 in one direction by a collar M—720 fixed to the spindle M—104 and in the other direction by a coil spring forming an element of the valve. When the spindles are separated, to permit changing drums, the spring holds the valve in position to admit pressure fluid to the rear ends of cylinders M—702, M—702' so that the stitcher wheels are close together. As the spindles move toward each other to chuck the drum, collar M—720 causes the valve to be depressed, reversing the pressure on the cylinders M—702, M—702' so that the stitcher wheels are moved apart.

Another four-way valve M—722 controls the supply of pressure fluid to cylinders M—710, M—710', and is actuated in one direction by a self contained spring and in the other direction by a solenoid M—723. When the spindles are separated and at rest the spring holds the valve in position to deliver pressure fluid to the rear ends of the cylinders M—710, M—710', to hold the stitcher wheels above the drum face and out of contact therewith. Solenoid M—723 is connected in the circuit of the driving motor M—724 (see Figs. 1ᵇ and 48) at this station so that when the motor is energized to rotate the spindles, the solenoid is energized to reverse the valve and deliver fluid under pressure to the front ends of cylinders M—710, M—710' to hold the stitcher wheels against the drum face.

At the end of the stitching operation, the stitching wheels M—709, M—709' are employed to lift the beads progressively from the drum to break the adhesive engagement of the tire to the drum. To accomplish this purpose, adjustable stops M—725, M—725' are provided on the cam plate to limit the retractive movement of the cross heads M—705, M—705'. As the cross heads reach the stops the pressure of the fluid in cylinders M—710, M—710' tending to retract the pistons causes the stitcher wheels M—709, M—709' to be rotated about the rock shafts in a direction to lift the stitcher wheels away from the drum against the heads about the rock shafts as a fulcrum.

As the drive motor M—724 stops, and before the spindles are separated to release the drum, the reversal of the fluid supply to cylinders M—710, M—710' causes the rock shafts to be rotated in a direction to withdraw the stitcher wheels from beneath the beads.

Valve M—719 receives its supply of fluid under pressure from pressure manifold 122 and exhausts to manifold 126, whereas valve M—722 is preferably supplied with air under pressure from an independent source (not shown) and exhausts to the atmosphere.

Operation

The operation of the units at the various stations will be apparent from the above detailed descriptions of the mechanism, the general operation of the machine however is described as follows:

The drums are placed in succession on the drum cradles of the conveyor in advance of station A. During the hauling movement of the conveyor the first drum is moved to station A in alignment with the spindles thereof. The rock shaft then operates automatically to move the spindles so that the drum is raised from the conveyor and centered simultaneously with the chucking of similar drums at other stations. At station A the operator pulls forward the leading end of the first ply of cord fabric and spots it on the drum. By depressing the foot switch at this station, he rotates the drum through a single revolution, separates the ply from the supply, and splices the band around the drum.

The drum is automatically released and returned to the conveyor by operation of the rock shaft, and the conveyor automatically transfers the drum to station B where it is again chucked by operation of the rock shaft.

At station B the next operator applies a second ply of cord with its cords crossing those of the first ply, the operator starting and stopping the rotation of the drum by means of a foot switch at the station. The drum is again automatically unchucked and hauled to the next station and rechucked.

At station C, after the drum is chucked, the spindles are automatically rotated in the manner previously described, while the margins of the plies overhanging the drum shoulders are formed down over the shoulders automatically in the manner also previously described. The rotation of the drum is automatically discontinued, the drum is automatically unchucked, and automatically hauled to station D.

At station D, the operator places a pair of bead cores upon the bead setting rings, inspects the condition of the previously applied plies, and then depresses a foot switch which in the manner previously described automatically causes the drum to be chucked between the spindles and then rotates the drum, places the beads thereon and rolls them into place, stops rotation of the drum, withdraws the rolling mechanism and bead placing rings, unchucks the drum and deposits it on the conveyor where it is automatically conveyed to station E.

At station E, the drum is automatically chucked and rotated and the margins of the plies extending laterally beyond the beads are automatically stitched up over the beads in the manner previously described, the stitching tools are automatically returned to their initial position and rotation of the drum is stopped, the drum being automatically returned to the conveyor and hauled to station F.

At station F the drum is automatically chucked, and rotation of the drum is controlled by the operator. Here the third ply of cord fabric is drawn from the supply and spotted on the drum by the operator who then rotates the drum through a single revolution by depressing a foot switch, tears the ply from the supply of material and splices it about the drum. The drum is then automatically conveyed to station G.

At station G the drum is automatically chucked, and rotation of the drum is controlled by the operator, who draws the fourth ply of cord fabric from the supply, spots the end on the drum, rotates the drum by depressing a foot switch, and splices the ply around the drum. The drum is then automatically conveyed to station H.

At station H the drum is automatically chucked, and rotation of the drum is controlled by the operator by means of a foot switch. Here the breaker strip and chafing strips are drawn from a supply by the operator and their leading ends spotted on the drum. The drum is rotated through a single revolution, and the operator cuts the strips from the supply and pastes the ends down to form a splice. The drum is then automatically conveyed to station I.

At station I, the drum is automatically chucked and rotated while the stitching rolls are automatically advanced against the tire at its center and automatically fed laterally along its surface to its margins. The stitching wheels are then automatically withdrawn and returned to their initial positions, rotation of the drum is discontinued and it is automatically conveyed to station J.

At station J the drum is automatically chucked, and rotation of the drum is controlled by the operator. The tread slab is drawn forward from the guides and its leading end spotted on the tire by the operator. The operator then lowers the pressing rollers against the tread by manipulating the valve by hand and rotates the drum by depressing a foot operated switch. He then stops the drum and tacks the ends of the tread at the splice to each other by hand. The drum is then automatically transferred to station K.

At station K, the drum is automatically chucked and rotated while the stitching wheels are automatically moved into engagement with the tread at its center, are fed laterally of the tread over its surface to its margins, and returned to their initial positions. The rotation of the drum is then automatically stopped and the drum is automatically conveyed to station L.

At station L, the drum is automatically chucked and rotation is effected by the hand operated gearing which the operator at that station employs to align the splice with the splice rolling device. After the operator has brought the splice to the correct position he causes the splice roller to traverse the splice, back and forth, by manual manipulation of the fluid pressure valve, rotating the drum slightly between traverse movements. The drum is then automatically transferred to station M.

At station M the drum is automatically chucked and rotated, and the turn-down stitcher mechanism operates automatically to form the margins of the material down over the bead cores and finally to loosen the margins of the tire from the drum. The drum is then automatically conveyed from the station to a position where it is removed from the conveyor.

The operations at the successive stations are accomplished during the same interval of time between conveyor movements on a plurality of drums, one at each station, so that at each movement of the conveyor a finished tire is delivered.

Variations may be made without departing from the scope of the invention as it is defined in the following claims.

We claim:

1. Apparatus for building tires, said apparatus comprising a hollow collapsible tire-building drum having inwardly-directed annular chucking seats near its outer periphery, means for detachably mounting the drum comprising opposed frusto-conical chucking elements having faces adapted to engage said seats by substantially full-circle contact, and means for operating said chucking elements to engage their faces within the seats on the drum.

2. Apparatus for building tires, said apparatus comprising a hollow collapsible drum, a plurality of chucking stations each comprising a pair of opposed, conical drum-centering members adapted to engage directly the ends of a hollow drum, means for conveying the drum from station to station between said members by engagement of the conveying means with the outer periphery of the drum, and means for simultaneously advancing the drum-centering members at a station into engagement with the drum.

3. Apparatus for building tires, said apparatus comprising a hollow collapsible drum having a substantially cylindrical work-supporting surface, a plurality of chucking stations each comprising a pair of opposed conical drum-centering members adapted to engage directly the ends of a hollow drum, means for conveying the drum from station to station between said members by engagement of the conveying means with the outer periphery of the drum, means for simultaneously advancing the drum-centering members at a station into engagement with the drum, means for driving the drum while so engaged, and means for releasing the drum from said members.

4. Apparatus for building tires, said apparatus comprising a hollow collapsible drum having a substantially cylindrical work-supporting surface, a plurality of chucking stations each comprising a pair of opposed conical drum-centering members adapted to engage directly the ends of a hollow drum, means for conveying drums from station to station between pairs of said opposed members by engagement of the conveying means with outer peripheries of the drums, means for simultaneously advancing the pairs of opposed members to engage drums at a plurality of stations, and means for simultaneously releasing the drums at a plurality of stations.

5. Apparatus for building tires, said apparatus comprising a hollow collapsible drum having a substantially cylindrical work-supporting surface, a plurality of chucking stations each comprising a pair of opposed conical drum-centering members adapted to engage directly the ends of a hollow drum, means engageable with the outer surface of the drums for conveying drums from station to station between pairs of said opposed members, means for simultaneously advancing the pairs of opposed members to engage drums at a plurality of stations, means for driving the drums at the stations, and means for simultaneously releasing the drums at a plurality of stations.

6. Apparatus for building tires, said apparatus comprising a hollow collapsible drum having a substantially cylindrical work-supporting surface, a plurality of chucking stations each comprising a pair of opposed drum centering members, means engageable with the outer surface of the drums for conveying drums from station to station between pairs of said opposed members, means for simultaneously advancing the pairs of opposed members to engage the drums at a plurality of stations, means for simultaneously driving the drums at a plurality of stations, and means for simultaneously releasing the drums at a plurality of stations.

7. Apparatus for building tires, said apparatus comprising a hollow collapsible drum having a substantially cylindrical work-supporting surface, a conveyor, means thereon for engaging a plurality of tire building drums by their work-supporting surfaces with their axes cross-wise of the conveyor, and means for performing a tire building operation upon each drum in succession.

8. Apparatus for building tires, said apparatus comprising a hollow collapsible drum having a substantially cylindrical work-supporting surface, a conveyor, means thereon for supporting a plurality of tire building drums from their work-supporting surfaces with their axes crosswise of the conveyor, means along the path of the conveyor for performing tire building operations successively upon the drums, and driving means for intermittently moving the conveyor.

9. Apparatus for building tires, said apparatus comprising a conveyor, means for supporting a plurality of tire-building drums thereon from their outer peripheries, means along the path of the conveyor for performing tire-building operations successively upon the drums, and driving means for intermittently moving the conveyor, said driving means comprising an element having a conveyor-advancing stroke and a return stroke and means for imparting a high speed to said element in its entire advancing stroke and a lower speed to the element in its entire return stroke.

10. Apparatus for building tires, said apparatus comprising a hollow collapsible tire building drum, a plurality of tire building stations, means for supporting the drum from its outer periphery, and means for conveying the drum from station to station with accelerative and decelerative movements between stations according substantially to simple harmonic motion.

11. Apparatus for building tires, said apparatus comprising a conveyor, and means for supporting a plurality of tire building drums thereon in spaced relation, said means comprising sets of free running rollers adapted to support a drum in cradle fashion from its work-supporting surface.

12. Apparatus for building tires, said apparatus comprising a hollow collapsible drum having a substantially cylindrical work supporting surface and open ends, a conveyor, a plurality of drum-supporting cradles thereon in spaced relation, a plurality of drum-manipulating stations located in the path of the conveyor in similarly spaced relation and having means adapted to engage the open ends of the drums on said cradles in succession and to lift them from the conveyor, means for intermittently moving the conveyor to transport the drums from station to station, and means for automatically and simultaneously manipulating said open ends of the drums at said stations between movements of said conveyor.

13. Apparatus for building tires, said apparatus comprising a hollow collapsible drum having a substantially cylindrical work-supporting surface and open inwardly facing tapered ends, a tire-building station having a pair of opposed drum-centering spindles having outwardly facing tapered driving surfaces for engaging in said ends, means for intermittently conveying a series of drums in succession into approximate alignment with said spindles by engagement with their outer peripheries, and means controlled by said conveying means for centering and driving a drum at the station during the interval between successive conveying movements.

14. Apparatus for building tires, said apparatus comprising an individual, movable carriage means for supporting a tire-building form from the outer periphery thereof, said carriage means being constructed and arranged for movement of the form with respect to its carriage, a tire-building station, means for moving the carriage and form to said station, and stationary form-driving means at said station.

15. Apparatus for building tires, said apparatus comprising a series of individual, movable carriage means for supporting tire-building forms from the outer peripheries thereof, said carriage means being constructed and arranged for movement of each form with respect to its carriage, a tire-building station, means for moving the carriages and forms in succession to said station, and stationary form-driving means at said station.

16. Apparatus for building tires, said apparatus comprising a series of individual, movable carriage means for supporting tire-building forms from the outer peripheries thereof, said carriage means being constructed and arranged for movement of each form with respect to its carriage means, a plurality of tire-building stations, means for moving the carriages and forms in succession to said stations, and stationary form-driving means at said stations.

17. Apparatus for building tires, said apparatus comprising an individual, movable carriage means for supporting a tire-building drum from the outer periphery thereof, said carriage means being constructed and arranged for movement of the drum with respect to its carriage, a tire-building station, means for moving the carriage and its drum to said station, and stationary drum-driving means at said station.

18. Apparatus for building tires, said apparatus comprising a hollow collapsible tire-building drum having a substantially cylindrical outer work-supporting surface and inwardly facing tapered driving surfaces at its opposite open ends closer to the outer periphery of the drum than to the axis thereof, and drum-centering and driving means comprising a pair of axially-aligned opposed driving members movable in a direction axial of said drum toward and away from each other and having substantially conical outwardly facing driving faces for supporting and driving the drum by frictional contact of said driving faces with said driving surfaces throughout substantially the entire circumference of said drum.

19. Apparatus for building tires, said apparatus comprising hollow collapsible tire-building drums each having a substantially cylindrical outer work-supporting surface and inwardly facing tapered driving surfaces at its opposite open ends, means for conveying a series of such drums by support from their outer peripheries and means for simultaneously lifting said drums from said conveying means for centering them clear of said conveying means by forces exerted radially outward of the drum, said lifting and centering means comprising axially aligned opposed conical driving members, and means for moving said members axially toward and from each other.

20. Apparatus for building tires, said apparatus comprising a hollow collapsible open-ended tire-building drum having a substantially cylindrical outer work-supporting surface and inwardly facing tapered driving surfaces at its opposite open ends, and drum centering and driving means comprising a pair of axially aligned opposed driving cones adapted frictionally to engage said driving surfaces by substantially full circle contact therewith at a position radially close to said work-supporting surface, and means for rotating said cones.

21. Apparatus for building tires, said apparatus comprising collapsible open-ended hollow tire-building drums each having a substantially cylindrical outer work-supporting surface and inwardly facing tapered driving surfaces at its opposite open ends, means for conveying a series of such drums in spaced-apart relation by support from their outer peripheries, means for lifting said drums from the conveying means and for driving the drums, the lifting and driving means comprising axially aligned opposed rotatable members having substantially conical outwardly facing surfaces to engage said driving surfaces, means for moving said members toward each other to lift the drums clear of said conveying means and to center them, and means for rotating said members.

22. Apparatus for building tires, said apparatus comprising collapsible open-ended hollow tire-building drums each having a substantially cylindrical work-supporting surface and inwardly facing tapered driving surfaces at its opposite open ends, means for conveying a series of such drums in spaced-apart relation by support from their outer peripheries, means for lifting said drums from said conveying means and for driving the same, said lifting and driving means comprising spaced-apart pairs of axially aligned opposed rotatable members having outwardly facing substantially conical surfaces to engage said driving surfaces, means for simultaneously moving all the members of said pairs of opposed members toward and from each other simultaneously to lift said drums clear of the conveying means and to center them, cushioning means for effecting simultaneous driving contact of all of said members with said drums, and means for rotating a plurality of said pairs of members simultaneously.

23. A tire building drum adapted to be centered and driven by opposed driving cones, said drum comprising a hollow, inwardly collapsible shell structure having a work-supporting outer surface continuing at the end margins of the drum into full-circle conical faces directed radially inward for engaging the driving cones.

24. A tire building drum adapted to be centered and driven by opposed driving cones, said drum comprising a hollow, inwardly collapsible shell structure having a work-supporting outer surface continuing at the end margins of the drum into full-circle conical faces directed radially inward for engaging the driving cones, said conical faces being closer to the outer periphery of the drum than to the axis thereof.

25. Apparatus for building tires, said apparatus comprising a hollow collapsible drum, a plurality of chucking stations each comprising a pair of opposed conical drum-centering members adapted to engage directly the ends of a hollow drum substantially throughout its circumference, and means for conveying the drum from station to station along a path between the drum centering members by engagement of the conveying means with the outer periphery of the drum.

FRANK S. STERNAD.
JOHN P. SAPP.

CERTIFICATE OF CORRECTION.

Patent No. 2,319,643.   May 18, 1943.

FRANK S. STERNAD, ET AL.

It is hereby certified that error appears in the printed specification of the above numbered patent requiring correction as follows: Page 6, first column, line 35, for "roll A—221" read --roll A—211--; page 8, second column, line 18-19, for "E—403' of devices form" read --E—403, E—403' of devious form--; line 20, for "marging" read --margin--; page 11, second column, line 75, for "surfaces" read --surface--; page 14, first column, line 52-53, claim 12, for "manipulating said open ends of the drums" read --manipulating said drums--; and that the said Letters Patent should be read with this correction therein that the same may conform to the record of the case in the Patent Office.

Signed and sealed this 3rd day of August, A. D. 1943.

(Seal)

Henry Van Arsdale,
Acting Commissioner of Patents.